(12) United States Patent
Bower et al.

(10) Patent No.: US 8,710,135 B2
(45) Date of Patent: *Apr. 29, 2014

(54) COMPOSITE MATERIALS COMPRISING AGGREGATE AND AN ELASTOMERIC COMPOSITION

(75) Inventors: David K. Bower, Canton, MI (US);
Steven Hicks, Brownstown, MI (US);
Melissa Terry, Brooklyn, NY (US);
Calvin T. Peeler, Canton, MI (US)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/517,943

(22) PCT Filed: Dec. 21, 2010

(86) PCT No.: PCT/US2010/061558
§ 371 (c)(1),
(2), (4) Date: Sep. 11, 2012

(87) PCT Pub. No.: WO2011/084793
PCT Pub. Date: Jul. 14, 2011

(65) Prior Publication Data
US 2012/0329934 A1     Dec. 27, 2012

Related U.S. Application Data

(60) Provisional application No. 61/288,637, filed on Dec. 21, 2009.

(51) Int. Cl.
*C08K 3/40* (2006.01)

(52) U.S. Cl.
USPC ............................................ 524/494

(58) Field of Classification Search
USPC ............................................ 524/494
See application file for complete search history.

(56) References Cited

U.S. PATENT DOCUMENTS

| | | |
|---|---|---|
| 3,240,736 A | 3/1966 | Beckwith |
| 3,272,098 A | 9/1966 | Buchholtz et al. |
| 3,577,893 A | 5/1971 | Towner |
| 3,690,021 A | 9/1972 | Glass et al. |
| 3,690,227 A | 9/1972 | Welty |
| 3,711,444 A | 1/1973 | Allen et al. |
| 3,850,537 A | 11/1974 | Bynum, Jr. |
| 3,909,474 A | 9/1975 | Borchert et al. |
| 3,911,667 A | 10/1975 | Komiyama |
| 3,958,891 A | 5/1976 | Eigenmann |
| 4,021,401 A | 5/1977 | Jeppsen |
| 4,063,839 A | 12/1977 | Brown |
| 4,076,917 A | 2/1978 | Swift et al. |
| 4,097,423 A | 6/1978 | Dieterich |
| 4,112,176 A | 9/1978 | Bailey |
| 4,114,382 A | 9/1978 | Kubens et al. |
| 4,139,676 A | 2/1979 | Janssen et al. |
| 4,247,933 A | 1/1981 | Nakamura |
| 4,271,493 A | 6/1981 | Tamaru et al. |
| 4,433,701 A | 2/1984 | Cox et al. |
| 4,452,551 A | 6/1984 | Arndt et al. |
| 4,550,153 A | 10/1985 | Carver |
| 4,559,239 A | 12/1985 | Cenegy |
| 4,630,963 A | 12/1986 | Wyman |
| 4,659,748 A | 4/1987 | Boddie |
| 4,761,099 A | 8/1988 | Mann et al. |
| 4,792,262 A | 12/1988 | Kapps et al. |
| 4,797,026 A | 1/1989 | Webster |
| 4,922,463 A | 5/1990 | Del Zotto et al. |
| 5,001,190 A | 3/1991 | Carpenter et al. |
| 5,043,955 A | 8/1991 | Dubois et al. |
| 5,106,227 A | 4/1992 | Ahmad et al. |
| 5,123,778 A | 6/1992 | Bohnhoff |
| 5,149,192 A | 9/1992 | Hamm et al. |
| 5,182,137 A | 1/1993 | Allen |
| 5,250,340 A | 10/1993 | Bohnhoff |

(Continued)

FOREIGN PATENT DOCUMENTS

| CA | 2037214 A1 | 9/1991 |
|---|---|---|
| CN | 1185501 A | 6/1998 |

(Continued)

OTHER PUBLICATIONS

English language machine-assisted translation for DE 651167 extracted from the espacenet.com database on Jun. 4, 2012, 9 pages.
English language partial machine-assisted translation for DE 20000015 extracted from the espacenet.com database on Jun. 4, 2012, 24 pages.
English language abstract for EP 0445578 extracted from the espacenet.com database on Jun. 4, 2012, 8 pages.
English language abstract and machine-assisted translation for EP 1176257 extracted from the espacenet.com database on Jun. 4, 2012, 25 pages.
English language abstract and machine-assisted translation for EP 1462571 extracted from the espacenet.com database on Jun. 4, 2012, 9 pages.

(Continued)

*Primary Examiner* — Peter Szekely
(74) *Attorney, Agent, or Firm* — Howard & Howard Attorneys PLLC

(57) ABSTRACT

A composite material comprises aggregate and an elastomeric composition. The elastomeric composition comprises the reaction product of an isocyanate component and an isocyanate-reactive component. The isocyanate component comprises a polymeric isocyanate, and optionally, an isocyanate-prepolymer. The isocyanate-reactive component comprises a hydrophobic polyol and a chain extender having at least two hydroxyl groups and a molecular weight of from about 62 to about 220. The chain extender is present in the isocyanate-reactive component in an amount of from about 1 to about 20 parts by weight based on 100 parts by weight of the isocyanate-reactive component. The aggregate may be rock, crumb rubber, and/or glass. The composite material has excellent physical properties and may be formed underwater, used in various locations, and used in various applications, such as for pavement, revetments, etc. Methods of forming and using the composite material and systems for forming the elastomeric composition are also disclosed.

24 Claims, 4 Drawing Sheets

(56) References Cited

U.S. PATENT DOCUMENTS

| | | | |
|---|---|---|---|
| 5,298,539 | A | 3/1994 | Singh et al. |
| 5,693,413 | A | 12/1997 | Hesterman et al. |
| 5,788,407 | A | 8/1998 | Hwang |
| 5,836,715 | A | 11/1998 | Hendrix et al. |
| 5,848,856 | A | 12/1998 | Bohnhoff |
| 5,891,938 | A | 4/1999 | Williams |
| 5,956,294 | A | 9/1999 | Takizawa et al. |
| 6,206,607 | B1 | 3/2001 | Medico, Jr. et al. |
| 6,225,371 | B1 | 5/2001 | Prerre |
| 6,235,367 | B1 | 5/2001 | Holmes et al. |
| 6,370,087 | B1 | 4/2002 | Akahane et al. |
| 6,495,652 | B1 | 12/2002 | Reichelt et al. |
| 6,702,514 | B2 | 3/2004 | Kaneko et al. |
| 6,826,122 | B2 | 11/2004 | Zaugg |
| 6,887,922 | B1 | 5/2005 | Roddis |
| 6,962,463 | B2 | 11/2005 | Chen |
| 7,041,221 | B2 | 5/2006 | Arnott |
| 7,168,884 | B2 | 1/2007 | Hart |
| 7,496,003 | B2 | 2/2009 | Muller |
| 7,782,717 | B2 | 8/2010 | Gil et al. |
| 7,879,921 | B2 | 2/2011 | Cummins |
| 8,025,456 | B2 | 9/2011 | Kaul |
| 2002/0016421 | A1 | 2/2002 | Goeb et al. |
| 2002/0022086 | A1 | 2/2002 | Hughes et al. |
| 2004/0091712 | A1 | 5/2004 | Marohn |
| 2004/0106726 | A1* | 6/2004 | Joshi et al. .................... 524/589 |
| 2004/0109730 | A1 | 6/2004 | Moss et al. |
| 2006/0293428 | A1 | 12/2006 | Singh et al. |
| 2007/0091727 | A1 | 4/2007 | Bonvin et al. |
| 2007/0093602 | A1 | 4/2007 | Thompson-Colon et al. |
| 2007/0172590 | A1 | 7/2007 | Hoffmann et al. |
| 2007/0189109 | A1 | 8/2007 | Long |
| 2007/0213456 | A1 | 9/2007 | Singh et al. |
| 2008/0058461 | A1 | 3/2008 | Cummins |
| 2008/0118637 | A1 | 5/2008 | Serwin |
| 2008/0144444 | A1 | 6/2008 | Mahler et al. |
| 2008/0151698 | A1 | 6/2008 | Gil et al. |
| 2008/0253235 | A1 | 10/2008 | Hiraga et al. |
| 2009/0062432 | A1 | 3/2009 | Doesburg et al. |
| 2009/0067924 | A1 | 3/2009 | Kaul |
| 2009/0067925 | A1 | 3/2009 | Kaul |
| 2009/0095820 | A1 | 4/2009 | Roser et al. |
| 2013/0011195 | A1* | 1/2013 | Bower et al. .................... 404/31 |
| 2013/0022810 | A1* | 1/2013 | Bower et al. ............... 428/317.5 |

FOREIGN PATENT DOCUMENTS

| | | |
|---|---|---|
| DE | 651167 C | 10/1937 |
| DE | 20000015 U1 | 5/2000 |
| EP | 0445578 A2 | 9/1991 |
| EP | 0583086 A1 | 2/1994 |
| EP | 0911304 A1 | 4/1999 |
| EP | 1176257 A2 | 1/2002 |
| EP | 1462571 A2 | 9/2004 |
| FR | 2188596 A5 | 1/1974 |
| FR | 2653360 A1 | 4/1991 |
| FR | 2791692 A1 | 10/2000 |
| GB | 1604405 | 12/1981 |
| JP | 2004-076527 A | 3/2004 |
| WO | WO 9500569 A1 | 1/1995 |
| WO | WO 9829356 A2 | 7/1998 |
| WO | WO 02/076900 A2 | 10/2002 |
| WO | WO 2009/033037 A1 | 3/2009 |
| WO | WO 2010/149737 A2 | 12/2010 |
| WO | WO 2011/084274 A1 | 7/2011 |
| WO | WO 2011/084802 A1 | 7/2011 |
| WO | WO 2011/084807 A1 | 7/2011 |

OTHER PUBLICATIONS

English language abstract and machine-assisted translation for FR 2653360 extracted from the espacenet.com database on Jun. 4, 2012, 17 pages.

English language abstract and machine-assisted translation for FR 2791692 extracted from the espacenet.com database on Jun. 4, 2012, 9 pages.

English language abstract and machine-assisted translation for JP 2004-076527 extracted from the PAJ database on Jun. 4, 2012, 30 pages.

English language abstract and machine-assisted translation for WO 9500569 extracted from the espacenet.com database on Jun. 4, 2012, 37 pages.

English language abstract and machine-assisted translation for WO 9829356 extracted from the espacenet.com database on Jun. 4, 2012, 28 pages.

International Search Report for Application No. PCT/US10/61558 dated Mar. 3, 2011, 2 pages.

International Search Report for Application No. PCT/US10/61574 dated Mar. 4, 2011, 2 pages.

International Search Report for Application No. PCT/US10/61587 dated Mar. 1, 2011, 2 pages.

International Search Report for Application No. PCT/EP10158989 dated Aug. 19, 2011, 4 pages.

Montes, F., Valavala, S., and Haselbach, L. "A New Test Method for Porosity Measurements of Portland Cement Pervious Concrete," J. ASTM Int. 2(1), 2005.

Crouch, L. K., Cates, M., Dotson, V. James, Jr., Honeycutt, Keith B., and Badoe, D. A. "Measuring the Effective Air Void Content of Portland Cement Pervious Pavements," ASTM Journal of Cement, Concrete, and Aggregates, 25(1), 2003.

Montes, F., Haselbach, L. "Measuring Hydraulic Conductivity in Pervious Concrete," Env. Eng. Sci. 23(6), 2006.

Schaefer, V., Wang, K., Suleimman, M., and Kevern, J. "Mix Design Development for Pervious Concrete in Cold Weather Climates," Final Report, Civil Engineering, Iowa State University, 2006.

English language abstract for EP 0911304 extracted from the espacenet.com database on Aug. 23, 2012, 9 pages.

English language translation for FR 2188596 extracted from the espacenet.com database on Aug. 23, 2012, 11 pages.

English language abstract for WO 02/076900 extracted from the espacenet.com database on Aug. 23, 2012, 16 pages.

International Search Report for Application No. PCT/US2010/058582 dated Apr. 27, 2011, 4 pages.

Database Chemical Abstracts, Chemi [Online], Oct. 7, 1991, Yamaguchi H. et al., "Manufacture of colored artificial stones with high strength", 2 pages.

English language machine-assisted translation for CN 1185501 extracted from the espacenet.com database on Mar. 13, 2014, 14 pages.

* cited by examiner

COMPOSITE MATERIALS COMPRISING AGGREGATE AND AN ELASTOMERIC COMPOSITION

CROSS REFERENCE TO RELATED APPLICATIONS

This application claims priority to and all the advantages of International Patent Application No. PCT/US2010/061558 filed on Dec. 21, 2010 and U.S. Provisional Patent Application Ser. No. 61/288,637, filed on Dec. 21, 2009, which is incorporated herewith by reference in its entirety.

FIELD OF THE INVENTION

The present invention generally relates to a composite material comprising aggregate and an elastomeric composition, and more specifically to a composite material comprising aggregate and an elastomeric composition comprising an isocyanate component comprising a polymeric isocyanate, and optionally, an isocyanate prepolymer, and the elastomeric composition further comprising an isocyanate-reactive component comprising a hydrophobic polyol and a chain extender, and to methods and systems employing the same.

DESCRIPTION OF THE RELATED ART

The use of composite materials to form articles such as pavement is generally known in the construction art. Generally, the composite material is produced by mixing at least one aggregate and at least one binder composition together. For example, in the case of concrete, the aggregate comprises sand and gravel, and the binder composition comprises cement and water.

Recently, there have been advancements in the use of polymeric materials as binder compositions. Generally, once the aggregate and the binder composition are mixed together, the composite material remains pliable or "workable" for only a short time, e.g. 45 minutes, before the composite material cures and is no longer pliable. Therefore, such composite materials are typically produced onsite as opposed to offsite to increase working time. Offsite production requires the composite material to be transported to a construction site thereby further decreasing working time of the composite material once onsite.

Conventional methods of producing composite materials onsite require aggregate to be placed on the ground (or already be present on the ground) before coming into contact with the binder composition. Subsequently, the aggregate is sprayed (or sheeted) with the binder composition. A significant drawback of such a method is an inconsistent coating of the aggregate, which creates inconsistencies in the composite material. Inconsistencies in the composite material can result in early failure of the composite material thereby requiring the composite material to be replaced at additional cost. In addition, such methods are time consuming. A common form of failure of the composite material is spalling, where the aggregate loosens from the composite material, eventually dislodging from the composite material altogether.

Alternatively, the aggregate and binder composition are tumbled in a batch mixer for several minutes until the aggregate is uniformly coated with the binder composition before it is set into place, such as by pouring the composite material into place. A significant drawback of this process, commonly referred to as a batch process, is once again reduced working time since the binder composition begins to immediately cure once present in the batch mixer.

Other than pavement, other forms of articles formed from composite materials include revetments. Revetments present an option for minimizing threats posed to coastal areas, such as threats of erosion. Conventional revetments typically comprise rock, timber, cement, sandbags, and/or masonry. The aforementioned revetments are disposed on land thereby separating land mass from a coastal area. The revetments are employed to absorb energy from waves and to prevent erosion of the land mass. The erosion may come from natural wave cycles, tropical storms, tsunamis, tides, floods, rising sea levels, etc.

One form of conventional revetment is produced by crushing rocks, mixing the crushed rocks with an isocyanate and a polyol to form a reaction mixture and subsequently disposing the reaction mixture on a coastal area. The step of mixing coats the crushed rocks with the isocyanate and polyol. A reaction occurs between the isocyanate and polyol to form a polyurethane reaction product having the crushed rock dispersed therein. After a period of time sufficient for curing, a composite material is formed which is suitable for use as a revetment.

Unfortunately, there are significant drawbacks with the aforementioned method and the revetment formed therefrom. One significant drawback is that a competing reaction between water and the isocyanate weakens cohesion between the polyurethane reaction product and the crushed rock in the composite material. Therefore, it is necessary to cure the composite material in the absence of water to impart the composite material with sufficient strength and durability to function as the revetment. This limitation prevents the composite material from curing at high tide or, alternatively, measures must be undertaken to remove water from the coastal area prior to disposing the composite material thereon. Such measures are expensive, time consuming, and burdensome. A common problem is the formation of bubbles or foaming in or on the polyurethane reaction product, which leads to premature failure of the composite material. Foaming weakens the polyurethane reaction product, thereby increasing the chance of spalling of the aggregate from the composite material.

Accordingly, there remains an opportunity to provide an improved system for forming an elastomeric composition that can be applied to aggregate. There also remains an opportunity for improved methods of forming elastomeric compositions and composite materials formed therefrom.

SUMMARY OF THE INVENTION AND ADVANTAGES

The present invention provides a composite material. The composite material comprises aggregate and an elastomeric composition. The elastomeric composition comprises the reaction product of an isocyanate component and an isocyanate-reactive component. The isocyanate component comprises a polymeric isocyanate, and optionally, an isocyanate-prepolymer. The isocyanate-reactive component comprises a hydrophobic polyol and a chain extender having at least two hydroxyl groups and a molecular weight of from about 62 to about 220. The chain extender is present in the isocyanate-reactive component in an amount of from about 1 to about 20 parts by weight based on 100 parts by weight of the isocyanate-reactive component.

The present invention further provides a method of forming the composite material. The method comprises the steps of providing aggregate and forming the elastomeric composition. The method further comprises the step of applying the elastomeric composition to the aggregate to form the composite material.

The present invention further provides a system for forming the elastomeric composition which bonds aggregate. The system comprises the isocyanate component and the isocyanate-reactive component. The isocyanate component of the system typically comprises the isocyanate-prepolymer and the polymeric isocyanate. The isocyanate-prepolymer is present in the isocyanate component in an amount of from about 25 to about 75 parts by weight based on 100 parts by weight of the isocyanate component.

The present invention further provides a method of repairing a pavement. The pavement has an outer surface with a repairable void. The method comprises the steps of disposing a quantity of the composite material into the repairable void, and optionally, on the pavement proximal to the repairable void, to form a mound. The method may optionally include the step of removing any debris from the repairable void. The method further comprises the step of compacting the mound to form a repair structure for the repairable void. The repair structure has a repair surface substantially parallel with the outer surface of the pavement.

The elastomeric composition has excellent physical properties that are imparted to the composite material, such as improved bond strength between the elastomeric composition and the aggregate, improved compressive strength, improved shear strength, and improved flexural strength, which reduces spalling of the aggregate from the composite material. The elastomeric composition has excellent cure properties, which allows for it to be used in various locations and for various applications, such as for forming revetments and pavement out of the composite material. The composite material can be formed in the presence of water, such as being formed while partially or completely submerged underwater. As such, the composite material can be used for minimizing and/or preventing erosion of various areas, such as coastal areas. Other forms of the composite material, such as pavement, can be either nonporous or porous, thereby reducing water run-off and other problems associated with conventional pavement and similar structures.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
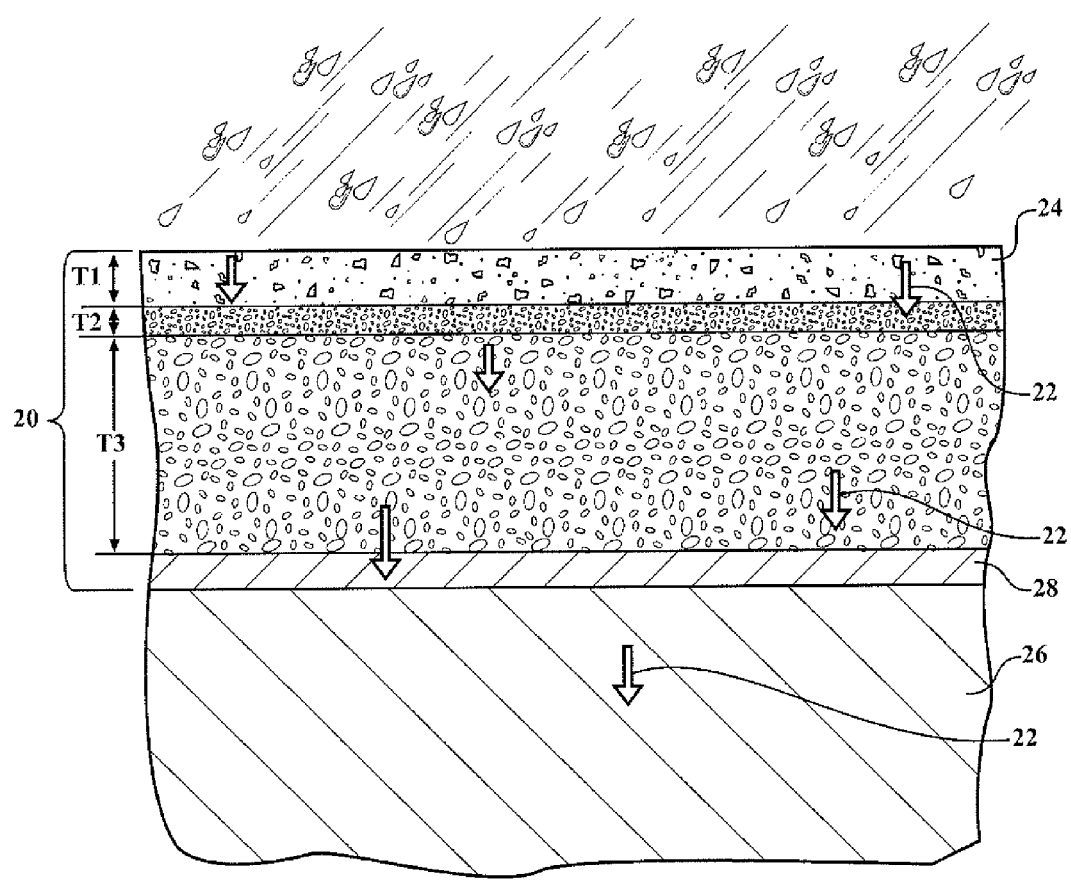
FIG. 1 is a partial cross-sectional view of a pavement structure illustrating water migration through the pavement structure, the pavement structure includes an upper layer of composite material.

The present invention provides a system for forming an elastomeric composition which bonds aggregate. The system comprises an isocyanate component and an isocyanate-reactive component. In certain embodiments, the isocyanate component comprises a polymeric isocyanate, and optionally, an isocyanate-prepolymer. In other embodiments, the isocyanate component comprises the polymeric isocyanate and the isocyanate-prepolymer. The isocyanate-reactive component comprises a hydrophobic polyol and a chain extender. Typically, the system is provided in two or more discrete components, such as the isocyanate component and the isocyanate-reactive (or resin) component, i.e., as a two-component (or 2K) system, which is described further below.

It is to be appreciated that reference to the isocyanate and resin components, as used herein, is merely for purposes of establishing a point of reference for placement of the individual components of the system, and for establishing a parts by weight basis. As such, it should not be construed as limiting the present invention to only a 2K system. For example, the individual components of the system can all be kept distinct from each other. The terminology "isocyanate-reactive" component and "resin" component is interchangeable in the description of the present invention.

The system may also comprise additional components, which may be included with either one or both of the isocyanate and resin components, or completely distinct, such as in a third component, as described further below. The system is used to form the elastomeric composition. In certain embodiments, the elastomeric composition is the reaction product of the isocyanate and isocyanate-reactive components. The elastomeric composition is described further below.

If employed, the isocyanate-prepolymer is generally the reaction product of an isocyanate and a polyol and/or a polyamine, typically the reaction product of an isocyanate and a polyol. The isocyanate-prepolymer can be formed by various methods understood by those skilled in the art or can be obtained commercially from a manufacturer, a supplier, etc.

With regard to the isocyanate used to form the isocyanate-prepolymer, the isocyanate includes one or more isocyanate (NCO) functional groups, typically at least two NCO functional groups. Suitable isocyanates, for purposes of the present invention include, but are not limited to, conventional aliphatic, cycloaliphatic, aryl and aromatic isocyanates. In certain embodiments, the isocyanate is selected from the group of diphenylmethane diisocyanates (MDIs), polymeric diphenylmethane diisocyanates (PMDIs), and combinations thereof. Polymeric diphenylmethane diisocyanates are also referred to in the art as polymethylene polyphenylene polyisocyanates. Examples of other suitable isocyanates, for purposes of the present invention include, but are not limited to, toluene diisocyanates (TDIs), hexamethylene diisocyanates (HDIs), isophorone diisocyanates (IPDIs), naphthalene diisocyanates (NDIs), and combinations thereof. Typically, the isocyanate used to form the isocyanate-prepolymer comprises diphenylmethane diisocyanate (MDI).

If employed to form the isocyanate-prepolymer, the polyol includes one or more hydroxyl (OH) functional groups, typically at least two OH functional groups. The polyol can be any type of polyol known in the art. The polyol is typically selected from the group of ethylene glycol, diethylene glycol, propylene glycol, dipropylene glycol, butanediol, glycerol, trimethylolpropane, triethanolamine, pentaerythritol, sorbitol, and combinations thereof. Other suitable polyols, for purposes of the present invention, are described below with description of an additional, optional, component, a supplemental polyol.

The polyol can be used in various amounts relative to the isocyanate, as long as an excess of NCO functional groups relative to OH functional groups are present prior to reaction such that the isocyanate-prepolymer, after formation, includes NCO functional groups for subsequent reaction. The isocyanate-prepolymer typically has an NCO content of from about 18 to about 28, more typically from about 20 to about 25, and yet more typically about 22.9, wt. %.

If employed to form the isocyanate-prepolymer, the polyamine includes one or more amine functional groups, typically at least two amine functional groups. The polyamine can be any type of polyamine known in the art. The polyamine is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof.

The polyamine can be used in various amounts relative to the isocyanate, as long as an excess of NCO functional groups relative to amine functional groups are present prior to reaction such that the isocyanate-prepolymer, after formation, includes NCO functional groups for subsequent reaction. The NCO content of the isocyanate-prepolymer is as described and exemplified above.

It is to be appreciated that the isocyanate-prepolymer may be formed from a combination of two or more of the aforementioned polyols and/or two or more of the aforementioned polyamines. Typically, the isocyanate-prepolymer is a reaction product of the isocyanate and at least one polyol such that the isocyanate-prepolymer includes urethane linkages and NCO functional groups after formation. In a specific embodiment of the present invention, the isocyanate-prepolymer comprises a blend of polymeric methyldiphenyldiisocyanate and quasi-prepolymers of 4,4'-methyldiphenyldiisocyanate. Specific examples of suitable isocyanate-prepolymers, for purposes of the present invention, are commercially available from BASF Corporation of Florham Park, N.J., under the trademark LUPRANATE®, such as LUPRANATE® MP102. It is to be appreciated that the system can include a combination of two or more of the aforementioned isocyanate-prepolymers.

With regard to the polymeric isocyanate, the polymeric isocyanate includes two or more NCO functional groups. The polymeric isocyanate typically has an average functionality of from about 1.5 to about 3.0, more typically from about 2.0 to about 2.8, and yet more typically about 2.7. The polymeric isocyanate typically has an NCO content of from about 30 to about 33, more typically from about 30.5 to about 32.5, and yet more typically about 31.5, wt. %.

Suitable polymeric isocyanates, for purposes of the present invention include, but are not limited to, the isocyanates described and exemplified above for description of the isocyanate-prepolymer. Typically, the polymeric isocyanate comprises polymeric diphenylmethane diisocyanate (PMDI).

Specific examples of suitable polymeric isocyanates, for purposes of the present invention, are commercially available from BASF Corporation under the trademark LUPRANATE®, such as LUPRANATE® M20 Isocyanate. It is to be appreciated that the system can include a combination of two or more of the aforementioned polymeric isocyanates.

The isocyanate-prepolymer is typically present in the isocyanate component in an amount of from about 25 to about 75, more typically from about 50 to about 75, yet more typically from about 55 to about 65, and yet even more typically about 60, parts by weight, each based on 100 parts by weight of the isocyanate component. In certain embodiments, the isocyanate-prepolymer is typically present in the system in an amount of from about 50 to about 250, more typically from about 100 to about 200, yet more typically from about 125 to about 175, and yet even more typically about 150, parts by weight, each per 100 parts by weight of the polymeric isocyanate in the system. Said another way, the isocyanate-prepolymer and the polymeric isocyanate are typically present in the system, e.g. in the isocyanate component, in a weight ratio of from about 1:2 to about 2.5:1, more typically from about 1:1 to about 2:1, yet more typically from about 1.25:1 to 1.75:1, and yet even more typically about 1.5:1.

Without being bound or limited to any particular theory, it is believed that the combination and ratios of the isocyanate-prepolymer and the polymeric isocyanate, as described and exemplified immediately above, imparts the elastomeric composition with increased tensile strength, elongation, hardness, and glass transition temperature, as well as improved tear strength relative to conventional elastomeric compositions.

With regard to the hydrophobic polyol, the hydrophobic polyol includes one or more OH functional groups, typically at least two OH functional groups. Hydrophobicity of the hydrophobic polyol can be determined by various methods, such as by visual inspection of the reaction product of the hydrophobic polyol with isocyanate where the reaction product has been immediately de-gassed after mixing the two components and then introduced into water, where the reaction product is allowed to cure. If there is no evidence of marring or wrinkling at the interface (or surface) between the reaction product and the water, or if there is no evidence of bubble or foam formation, hydrophobicity of the hydrophobic polyol is considered excellent.

The hydrophobic polyol typically comprises a natural oil polyol (NOP). In other words, the hydrophobic polyol is typically not a petroleum-based polyol, i.e., a polyol derived from petroleum products and/or petroleum by-products. In general, there are only a few naturally occurring vegetable oils that contain unreacted OH functional groups, and castor oil is typically the only commercially available NOP produced directly from a plant source that has sufficient OH functional group content to make castor oil suitable for direct use as a polyol in urethane chemistry. Most, if not all, other NOPs require chemical modification of the oils directly available from plants. The NOP is typically derived from any natural oil known in the art, typically derived from a vegetable or nut oil. Examples of suitable natural oils, for purposes of the present invention, include castor oil, and NOPs derived from soybean oil, rapeseed oil, coconut oil, peanut oil, canola oil, etc. Employing natural oils can be useful for reducing environmental footprints.

Typically, as alluded to above, the hydrophobic polyol comprises castor oil. Those skilled in the art appreciate that castor oil inherently includes OH functional groups whereas other NOPs may require one or more additional processing steps to obtain OH functional groups. Such processing steps, if necessary, are understood by those skilled in the art. Suitable grades of castor oil, for purposes of the present invention, are commercially available from a variety of suppliers. For example, T31® Castor Oil, from Eagle Specialty Products (ESP) Inc. of St. Louis, Mo., can be employed as the hydrophobic polyol. Specific examples of other suitable hydrophobic polyols, for purposes of the present invention, are commercially available from Cognis Corporation of Cincinnati, Ohio, under the trademark SOVERMOL®, such as SOVERMOL® 750, SOVERMOL® 805, SOVERMOL® 1005, SOVERMOL® 1080, and SOVERMOL® 1102.

The hydrophobic polyol is typically present in the system in an amount of from about 80 to about 99, more typically about 85 to about 95, yet more typically from about 90 to about 95, and yet even more typically about 92.5, parts by weight, each based on 100 parts by weight of the resin component of the system. It is to be appreciated that the system can include a combination of two or more of the aforementioned hydrophobic polyols.

With regard to the chain extender, the chain extender has at least two OH functional groups. The chain extender typically has a molecular weight of from about 62 to about 220, more typically from about 62 to about 150, and yet more typically about 132. As such, the chain extender can be referred to in the art as a "short" chain extender. The chain extender typically comprises an alkylene glycol. Examples of suitable chain extenders, for purposes of the present invention, include dipropylene glycol (DPG), diethylene glycol (DEG), NIAX® DP-1022, 1,3-propanediol, 1,4-butanediol, 1,5-pentanediol, 1,6-hexanediol, and 2-butene-1,4-diol. In a specific embodiment, the chain extender is dipropylene glycol.

The chain extender is typically present in the system in an amount of from about 1.0 to about 20, more typically from about 5.0 to about 10, and yet more typically about 7, parts by weight, each based on 100 parts by weight of the resin component. It is to be appreciated that the system may include any combination of two or more of the aforementioned chain extenders.

Without being bound or limited to any particular theory, it is believed that the chain extender imparts increased strength to the elastomeric composition, as well as increased strength, tear strength, and hardness to the elastomeric composition.

In other embodiments of the present invention, a supplemental polyol, such as a petroleum-based polyol, may be used in addition to the hydrophobic polyol. If employed, the supplemental polyol is typically selected from the group of conventional polyols, such as ethylene glycol, diethylene glycol, propylene glycol, dipropylene glycol, butane diol, glycerol, trimethylolpropane, triethanolamine, pentaerythritol, sorbitol, and combinations thereof. Typically, the supplemental polyol is selected from the group of polyether polyols, polyester polyols, polyether/ester polyols, and combinations thereof; however, other supplemental polyols may also be employed as described further below.

Suitable polyether polyols, for purposes of the present invention include, but are not limited to, products obtained by the polymerization of a cyclic oxide, for example ethylene oxide (EO), propylene oxide (PO), butylene oxide (BO), or tetrahydrofuran in the presence of polyfunctional initiators. Suitable initiator compounds contain a plurality of active hydrogen atoms, and include water, butanediol, ethylene glycol, propylene glycol (PG), diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof.

Other suitable polyether polyols include polyether diols and triols, such as polyoxypropylene diols and triols and poly(oxyethylene-oxypropylene)diols and triols obtained by the simultaneous or sequential addition of ethylene and propylene oxides to di- or trifunctional initiators. Copolymers having oxyethylene contents of from about 5 to about 90% by weight, based on the weight of the polyol component, of which the polyols may be block copolymers, random/block copolymers or random copolymers, can also be used. Yet other suitable polyether polyols include polytetramethylene glycols obtained by the polymerization of tetrahydrofuran.

Suitable polyester polyols, for purposes of the present invention include, but are not limited to, hydroxyl-terminated reaction products of polyhydric alcohols, such as ethylene glycol, propylene glycol, diethylene glycol, 1,4-butanediol, neopentylglycol, 1,6-hexanediol, cyclohexane dimethanol, glycerol, trimethylolpropane, pentaerythritol or polyether polyols or mixtures of such polyhydric alcohols, and polycarboxylic acids, especially dicarboxylic acids or their esterforming derivatives, for example succinic, glutaric and adipic acids or their dimethyl esters sebacic acid, phthalic anhydride, tetrachlorophthalic anhydride or dimethyl terephthalate or mixtures thereof. Polyester polyols obtained by the polymerization of lactones, e.g. caprolactone, in conjunction with a polyol, or of hydroxy carboxylic acids, e.g. hydroxy caproic acid, may also be used.

Suitable polyesteramides polyols, for purposes of the present invention, may be obtained by the inclusion of aminoalcohols such as ethanolamine in polyesterification mixtures. Suitable polythioether polyols, for purposes of the present invention, include products obtained by condensing thiodiglycol either alone, or with other glycols, alkylene oxides, dicarboxylic acids, formaldehyde, aminoalcohols or aminocarboxylic acids. Suitable polycarbonate polyols, for purposes of the present invention, include products obtained by reacting diols such as 1,3-propanediol, 1,4-butanediol, 1,6-hexanediol, diethylene glycol or tetraethylene glycol with diaryl carbonates, e.g. diphenyl carbonate, or with phosgene. Suitable polyacetal polyols, for purposes of the present invention, include those prepared by reacting glycols such as diethylene glycol, triethylene glycol or hexanediol with formaldehyde. Other suitable polyacetal polyols may also be prepared by polymerizing cyclic acetals. Suitable polyolefin polyols, for purposes of the present invention, include hydroxy-terminated butadiene homo- and copolymers and suitable polysiloxane polyols include polydimethylsiloxane diols and triols.

Specific examples of suitable supplemental polyols, for purposes of the present invention, are commercially available from BASF Corporation under the trademark of PLURACOL®, such as PLURACOL® GP Series polyols. A specific example of a suitable supplement polyol, for purposes of the present invention, is PLURACOL® GP430.

If employed, the supplemental polyol is typically present in the system in an amount of from about 1 to about 75, more typically from about 10 to about 50, and yet more typically about 40, parts by weight, each based on 100 parts by weight of the resin component of the system. It is to be appreciated that the system may include any combination of two or more of the aforementioned supplemental polyols.

The system may include one or more additional components, such as an additive component, in addition or alternate to the supplemental polyol. The additive component may comprise any conventional additive known in the art. Suitable additives, for purposes of the present invention include, but are not limited to, chain-extenders, cross-linkers, chain-terminators, processing additives, adhesion promoters, flame retardants, anti-oxidants, defoamers, anti-foaming agents, water scavengers, molecular sieves, fumed silicas, ultraviolet light stabilizers, fillers, thixotropic agents, silicones, surfactants, catalysts, colorants, inert diluents, and combinations thereof. If employed, the additive component may be included in the system any amount, such as from about 0.05 to 10 parts by weight based on 100 parts by weight of the resin component of the system.

In certain embodiments, the additive component comprises an antifoaming agent. In one embodiment, the antifoaming agent comprises a silicone fluid including powdered silica dispersed therein. The silicone fluid can be employed to reduce and/or eliminate foaming of the elastomeric composition. It should be appreciated that the silicone fluid may be predisposed in a solvent. Examples of antifoaming agents include Antifoam MSA and Antifoam A, commercially available from Dow Corning of Midland, Mich.

If employed, the antifoaming agent is typically present in the system in an amount of from about 0.01 to about 0.10, more typically from about 0.025 to about 0.075, and yet more typically about 0.05, parts by weight, each based on 100 parts by weight of the resin component of the system. It is to be appreciated that the system may include any combination of two or more of the aforementioned antifoaming agents.

In certain embodiments, the additive component comprises a molecular sieve. The molecular sieve is a hygroscopic agent that can be employed to maintain or increase desiccation, i.e., a state of dryness. The molecular sieve typically comprises molecules having a plethora of small pores. The small pores allow for molecules having a size smaller than the pores, such as water molecules, to be adsorbed while larger molecules, such as those present in the isocyanate and resin component, cannot be adsorbed. Typically, the molecular sieve can adsorb water up to and in excess of 20% of the weight of the molecular sieve. The molecular sieve, therefore, can act synergistically and in concert with the hydrophobic polyol to minimize the effect of water on the elastomeric composition by adsorbing water before the water has a chance to react with the isocyanate component of the system.

If employed, it should be appreciated that any molecular sieve known in the art can be used, such as aluminosilicate minerals, clays, porous glasses, microporous charcoals, zeolites, active carbons, or synthetic compounds that have open structures through which small molecules, e.g. water, can diffuse. Examples of suitable molecular sieves include Baylith Paste and Molecular Sieve 3A, which are available from a variety of suppliers, such as Zeochem of Louisville, Ky.

If employed, the molecular sieve is typically present in the system in an amount of from about 0.01 to about 5.0, more typically from about 0.10 to about 2.0, and yet more typically about 0.50, parts by weight, each based on 100 parts by weight of the resin component of the system. It is to be appreciated that the system may include any combination of two or more of the aforementioned molecular sieves.

In certain embodiments, the additive component comprises fumed silica, which is commercially available from a variety of suppliers. An example of a suitable fumed silica is AEROSIL® R-972, commercially available from Evonic Industries Inc. of Essen, Germany. Fumed silica generally acts as a rheology control agent, and, if the fumed silica is hydrophobic, it imparts additional hydrophobicity to the elastomeric composition.

If employed, the fumed silica is typically present in the system in an amount of from about 0.10 to about 10.0, more typically from about 1.0 to about 7.0, and yet more typically about 5.0, parts by weight, each based on 100 parts by weight of the resin component of the system. It is to be appreciated that the system may include any combination of two or more fumed silicas.

In certain embodiments, the additive component comprises a colorant. The colorant can be selected from the group of pigments, dyes, and combinations thereof. The colorant can be in either liquid or powder form. If employed, the colorant is typically a pigment or a pigment blend of two or more pigments. The pigment, or pigment blend, is used to impart a desired color to the elastomeric composition and, if the pigment is inorganic, the pigment can also impart UV protection to the elastomeric composition.

Different types of pigments can be used for purposes of the present invention. For example, titanium dioxide can be used to impart a white color and carbon black can be used to impart a black color, to the elastomeric composition, respectively, while various blends of titanium dioxide and carbon black can be used to impart various shades of gray to the elastomeric composition.

Examples of suitable grades of carbon black and titanium dioxide for purposes of the present invention are commercially available from Columbian Chemicals Company of Marietta, Ga., and DuPont® Titanium Technologies of Wilmington, Del., respectively. Other pigments including, but not limited to, red, green, blue, yellow, green, and brown, and pigment blends thereof, can also be used to impart color to the elastomeric composition in addition to or alternative to carbon black and/or titanium dioxide.

More specific examples of colors, based on one or more colorants, include sapphire blue, jade green, Sedona red, amber brown, and topaz brown. Examples of suitable grades of pigments for purposes of the present invention are commercially available from various companies such as BASF Corporation and Penn Color, Inc. of Hatfield, Pa. It is to be appreciated that various blends of the aforementioned colorants, e.g. pigments, can be used to impart the elastomeric composition with various colors, strengths, and shades.

If employed, the colorant is typically present in the system in an amount of from about 0.10 to about 5.0, more typically from about 1.0 to about 3.0, and yet more typically about 2.0, parts by weight, each based 100 parts by weight of the resin component of the system. It is to be appreciated that the system may include any combination of two or more of the aforementioned colorants.

In certain embodiments, the additive component comprises a catalyst component. In one embodiment, the catalyst component comprises a tin catalyst. Suitable tin catalysts, for purposes of the present invention, include tin(II) salts of organic carboxylic acids, e.g. tin(II)acetate, tin(II) octoate, tin(II) ethylhexanoate and tin(II) laurate. In one embodiment, the organometallic catalyst comprises dibutyltin dilaurate, which is a dialkyltin(IV) salt of an organic carboxylic acid. Specific examples of suitable organometallic catalyst, e.g. dibutyltin dilaurates, for purposes of the present invention, are commercially available from Air Products and Chemicals, Inc. of Allentown, Pa., under the trade name DABCO®. The organometallic catalyst can also comprise other dialkyltin (IV) salts of organic carboxylic acids, such as dibutyltin diacetate, dibutyltin maleate and dioctyltin diacetate.

Examples of other suitable catalysts, for purposes of the present invention, include amine-based catalysts, bismuth-based catalysts, nickel-base catalysts, zirconium-based catalysts, zinc-based catalysts, aluminum-based catalysts, lithium-based catalysts, iron(II) chloride; zinc chloride; lead octoate; tris(dialkylaminoalkyl)-s-hexahydrotriazines including tris(N,N-dimethylaminopropyl)-s-hexahydrotriazine; tetraalkylammonium hydroxides including tetramethylammonium hydroxide; alkali metal hydroxides including sodium hydroxide and potassium hydroxide; alkali metal alkoxides including sodium methoxide and potassium isopropoxide; and alkali metal salts of long-chain fatty acids having from 10 to 20 carbon atoms and/or lateral OH groups.

Further examples of other suitable catalysts, specifically trimerization catalysts, for purposes of the present invention, include N,N,N-dimethylaminopropylhexahydrotriazine, potassium, potassium acetate, N,N,N-trimethyl isopropyl amine/formate, and combinations thereof. A specific example of a suitable trimerization catalyst is commercially available from Air Products and Chemicals, Inc. under the trade name POLYCAT®.

Yet further examples of other suitable catalysts, specifically tertiary amine catalysts, for purposes of the present invention, include 1-methylimidazol, DAB CO 33-LV, dimethylaminoethanol, dimethylaminoethoxyethanol, triethylamine, N,N,N',N'-tetramethylethylenediamine, N,N-dimethylaminopropylamine, N,N,N',N',N"-pentamethyldipropylenetriamine, tris(dimethylaminopropyl)amine, N,N-dimethylpiperazine, tetramethylimino-bis(propylamine), dimethylbenzylamine, trimethylamine, triethanolamine, N,N-diethyl ethanolamine, N-methylpyrrolidone, N-methylmorpholine, N-ethylmorpholine, bis(2-dimethylamino-ethyl)ether, N,N-dimethylcyclohexylamine (DMCHA), N,N,N',N',N"-pentamethyldiethylenetriamine, 1,2-dimethylimidazole, 3-(dimethylamino)propylimidazole, and combinations thereof. Specific examples of suitable tertiary amine catalysts are commercially available from Air Products and Chemicals, Inc. under the trade name POLYCAT®, e.g. POLYCAT® 41.

If employed, the catalyst component can be employed in various amounts. Typically, the catalyst component is used in an amount to ensure adequate open/working time. It is to be appreciated that the catalyst component may include any combination of the aforementioned catalysts.

The system may be supplied to consumers for use by various means, such as in railcars, tankers, large sized drums and containers or smaller sized drums, kits and packets. For example, one kit can contain the isocyanate component and another kit can contain the resin component. Providing the components of the system to consumers separately provides for increased formulation flexibility of the elastomeric compositions formed therefrom. For example, a consumer can select a specific isocyanate component and a specific resin component, and/or amounts thereof, to prepare an elastomeric composition.

The isocyanate and resin components typically have excellent storage stability or "free" stability. As such, the isocyanate and resin components can be separately stored (as the system) for extended periods of time before combining them to form the elastomeric composition. It is to be appreciated that the system can comprise two or more different isocyanate components and/or two or more different resin components, which can be employed to prepare the elastomeric composition. It is also to be appreciated that other components (e.g. the supplemental polyol, the additive component, etc.), if employed, can be supplied in the aforementioned isocyanate and/or resin components, or supplied as distinct components.

The present invention further provides a composite material. The composite material comprises aggregate and the elastomeric composition. The elastomeric composition is generally formed from the isocyanate and resin components, as described and exemplified above. As introduced above, in certain embodiments, the isocyanate component comprises the polymeric isocyanate, and optionally, the isocyanate-prepolymer. In other embodiments, the isocyanate component comprises the polymeric isocyanate and the isocyanate-prepolymer. The isocyanate-reactive component comprises the hydrophobic polyol and the chain extender.

The amount of elastomeric composition present in the composite material generally depends on the particle size of the aggregate. Typically, the larger the aggregate particle size, the less elastomeric composition is required to form the composite material, and the smaller the aggregate size, the more elastomeric composition is required to form the composite material. Smaller sized aggregate generally requires more elastomeric composition because there is more surface area to coat relative to larger sized aggregate. For example, with 0.25 inch aggregate, the elastomeric composition is typically present in the composite material in an amount of from about 1.0 to about 10.0, more typically from about 2.5 to about 5.0, and yet more typically about 4.2, parts by weight, each based on 100 parts by weight of the composite material.

As used herein, the term aggregate is to be interpreted as referring to aggregate or aggregates in general and not to a single aggregate, nor is it to be construed to require more than one aggregate. Additionally, the term aggregate, as used herein, is intended to encompass a broad category of materials that serves as reinforcement to the composite material, such as rock, glass, rubber crumb, architectural stone, etc. The term rock, as used herein, is intended to encompass all forms of rock, including, but not limited to, gravel, sand, etc. Additionally, the term rock as used herein is intended to encompass all species of rock, such as granite, limestone, marble, etc.

In certain embodiments, the aggregate comprises rock. It is to be appreciated that any type of rock can be used. The rock is typically selected from the group of granite, limestone, marble, beach stone, river rock, and combinations thereof. In a specific embodiment, the rock is granite.

The rock is typically present in the aggregate in an amount of from about 1 to about 100, more typically from about 50 to about 100, yet more typically from about 90 to about 100, and yet even more typically about 100, parts by weight, each based on 100 parts by weight of the aggregate in the composite material. The remainder of the aggregate, if any, can be another different aggregate, such as sand, gravel, etc.

The average diameter of the rock is typically from about 0.001 to about 7.0, more typically from about 0.10 to about 5.0, yet more typically from about 0.25 to about 5.0, and yet even more typically from about 0.5 to about 3.0, inches. In other embodiments, the rock may be larger or smaller in size.

In certain embodiments, the aggregate comprises rubber crumb. It is to be appreciated that any type of rubber crumb can be used. Although not required, the rubber crumb may be post-consumer and/or recycled rubber. The rubber crumb can be of various classifications, such as No. 1, 2, 3, 4, and/or 5.

The rubber crumb is typically present in the aggregate in an amount of from about 1 to about 100, more typically from about 50 to about 100, yet more typically from about 90 to about 100, and yet even more typically about 100, parts by weight, each based on 100 parts by weight of the aggregate in the composite material. The remainder of the aggregate, if any, can be another different aggregate, such as sand, gravel, etc.

The average diameter of the rubber crumb is typically from about 0.10 to about 3.0, more typically from about 0.10 to about 2.0, and yet more typically from about 0.10 to about 0.25, inches. Suitable grades of rubber crumb, for purposes of the present invention, are commercially available from Entech Inc. of White Pigeon, Mich.

In certain embodiments, the aggregate comprises glass. It is to be appreciated that any type of glass may be used for purposes of the present invention. The glass may be clear, tinted, and/or colored. Although not required, the glass may be post-consumer and/or recycled glass. Using such glass can reduce the overall cost of the composite material and reduce the environmental footprint.

The glass is typically present in the aggregate in an amount of from about 1 to about 100, and more typically from about 50 to about 100, yet more typically from about 80 to about 100, and yet even more typically about 100, parts by weight, each based on 100 parts by weight of the aggregate present in the composite material. The remainder of the aggregate, if any, can be another different aggregate, such as sand, gravel, etc. It is believed that increasing the amount of glass present in the aggregate improves the flexural modulus and compressive strength of the composite material.

The average diameter of the glass is typically from about 0.001 to about 1.0, more typically from about 0.10 to about 0.50, and yet more typically from about 0.125 to about 0.25, inches. It is believed that reducing the average diameter of the glass reduces spalling of the aggregate from the composite material (i.e., loosened or loose pieces of glass) and improves resistance to flexural stresses, such as stresses encountered from a tire being turned on the composite material. When employed, the glass is typically crushed to meet the average diameter ranges as described above. For safety, the glass is typically tumbled or vibrated over screens for rounding sharp edges of the glass. Suitable grades of glass, for purposes of the present invention, are commercially available from Glass Plus Inc. of Tomahawk, Wis.

In certain embodiments, the glass includes a surface treatment comprising (or providing) at least one functional group reactive with an isocyanate group of the elastomeric composition. Examples of suitable functional groups, for purposes of the present invention, include hydroxyl, thiol, epoxy, and/or primary and secondary amine groups. Typically, the surface treatment comprises at least one amine and/or amino functional group. It is to be appreciated that the surface treatment can include a combination of different functional groups.

Surface treatment can be imparted to the glass by various methods, such as by employing an aminosilane, more specifically an organofunctional alkoxysilane, e.g. SILQUEST® A-1100, SILQUEST® A-1120, and/or SILQUEST® A-1170, which are commercially available from Momentive Performance Materials of Albany, N.Y. For example, the glass can be washed and treated with the aminosilane to impart the surface treatment to the glass. Said another way, the glass now includes one or more functional groups imparted by the aminosilane reacting with the glass. The glass may be referred to as being "primed" or "silylated". The functional groups, e.g. amine/amino groups, are reactive with isocyanate functional groups of the elastomeric composition. The isocyanate functional groups can be free isocyanate functional groups after reaction to form the elastomeric composition, such as in instances of over indexing, or isocyanate functional groups imparted by one or more components of the elastomeric composition itself, e.g. the isocyanate-prepolymer, such that the functional groups of the glass become part of the reaction to form the elastomeric composition.

It is believed that surface treating the glass improves durability, reduces spalling of the aggregate, and increases strength of the composite material. This is especially true if a chemical bond forms between the elastomeric composition and the surface of the glass. For example, one or more —Si— O— bonds may be present between the surface of the glass and the elastomeric composition. It is also believed that the surface treatment makes the composite material much more stable to environmental forces, such as heat and humidity, which could potentially reduce its strength during application. In certain embodiments, the glass used as the aggregate of the present invention comprises the glass aggregate described in co-pending application PCT/US10/58582, incorporated herein by reference in its entirety to the extent that the disclosure does not conflict with the general scope of the present invention described herein. PCT/US10/58582 describes various methods for surface treating glass aggregate, as well as benefits of surface treatment which is imparted to the composite material of the present invention.

It is to be appreciated that the aggregate may include a combination of two or more of the aforementioned aggregates. For example, the aggregate of the composite material can comprise glass and rock. In these embodiments, the glass is typically present in the aggregate an amount of from about 1.0 to about 99, more typically from about 25 to about 99, and yet more typically from about 75 to about 99, parts by weight, each based on 100 parts by weight of the aggregate present in the composite material. Further, the rock is typically present in the aggregate in an amount of from about 99 to about 1.0, more typically from about 75 to about 1.0, and yet more typically from about 25 to 1.0, parts by weight, each based on 100 parts by weight of the aggregate present in the composite material.

The aggregate can be supplied to consumers for use by various means, such as in railcars, tankers, large and small sized supersacks, large sized drums and containers or smaller sized drums, kits and packets. As described and exemplified above for description of the system, providing the components of composite material to consumers separately provides for increased formulation flexibility of the composite materials formed therefrom. For example, a consumer can select a specific aggregate, a specific isocyanate component, and a specific resin component, and/or amounts thereof, to prepare the composite material.

Typically, the aggregate is dry (but for possible ambient humidity, if present), to prevent premature reaction with the isocyanate component of the system. In addition, it is believed that curing and bonding strength of the elastomeric composition can be improved when the aggregate is dry. The aggregate can be kept dry by various methods, such as by using waterproof or water-resistant supersacks. However, in certain embodiments, the aggregate can at least be partially or completely submerged underwater, as described further below. It should also be appreciated that the aggregate may already be present in the location desired to include the composite material, e.g. a railroad bed or along a coast line. As such, the aggregate may not need to be separately provided.

Further examples of suitable components, for purposes of the present invention, are generally described in U.S. Patent Publication Nos. 2009/0067924 and 2009/0067295, both to Kaul, the disclosures of which, as well as the disclosures of patents and publications referenced therein, are incorporated herein by reference in their entirety to the extent that the disclosures do not conflict with the general scope of the present invention described herein.

In certain embodiments, the composite material has a crush strength (or compressive strength) of from about 100 to about 2500, more typically from about 500 to about 1800, yet more typically from about 1300 to about 1600, and yet even more typically about 1500, psi, according to ASTM D 1621. In certain embodiments, the composite material typically has a flexural strength of from about 50 to about 1000, more typically from about 200 to about 1000, yet more typically from about 700 to about 1000, and yet even more typically about 700, psi, according to ASTM D 790. In certain embodiments, the composite material typically has a flexural modulus of from about 20000 to about 150000, more typically from about 50000 to about 150000, yet more typically from about 100000 to about 150000, and yet even more typically about 100000, psi, according to ASTM D 790.

In certain embodiments, the composite material has a porosity (or void volume) of from about 30 to about 50, more typically from about 34 to about 45, yet more typically from about 35 to about 42, and yet even more typically from about 37 to about 38, %. Porosity of the composite material can be determined by various methods understood in the art, such as: Montes, F., Valavala, S., and Haselbach, L. "A New Test Method for Porosity Measurements of Portland Cement Pervious Concrete," J. ASTM Int. 2(1), 2005 and Crouch, L. K., Cates, M., Dotson, V. James, Jr., Honeycutt, Keith B., and Badoe, D. A. "Measuring the Effective Air Void Content of Portland Cement Pervious Pavements," ASTM Journal of Cement, Concrete, and Aggregates, 25(1), 2003.

Increasing the porosity of the composite material is useful for reducing run-off, such as rain run-off. In certain embodiments, the void fractions can also reduce hydrocarbons. For example, hydrocarbons, such as motor oil dripping from an automobile, can flow down through the porous composite material and adsorb onto the aggregate particles, e.g. glass, where the hydrocarbons can be digested by bacteria over time, thus preventing the hydrocarbons from contaminating the soil and/or groundwater.

It is believed that the porosity of the composite material allows the composite material to accept very large volumes of water in a short period of time. In certain embodiments, testing of a pavement structure formed from the composite material indicated that the pavement structure can accept about 1600 inches of water per hour. Also, it is believed that the porosity makes the maintenance of pavement structures formed from the composite material easier because sediment deposited in the pores can be removed with little effort. Air flow through the composite material also allows it to release heat through convection much quicker than conventional pavements so the pavement structure cools down in a much shorter period of time after a heat source is removed relative to conventional pavements.

In certain embodiments, the composite material has a permeability of from about 500 to about 4000, more typically from about 1000 to about 3000, yet more typically from about 1500 to about 2000, and yet even more typically about 1650, inches/hour. Permeability of the composite material can be determined by various methods understood in the art, such as: Montes, F., Haselbach, L. "Measuring Hydraulic Conductivity in Pervious Concrete," Env. Eng. Sci. 23(6), 2006 and Schaefer, V., Wang, K., Suleimman, M. and Kevern, J. "Mix Design Development for Pervious Concrete in Cold Weather Climates," Final Report, Civil Engineering, Iowa State University, 2006. Increasing the permeability of the composite material is useful for reducing runoff. In other embodiments, such as those described further below, the composite material is nonporous.

In certain embodiments, the elastomeric composition, upon approaching or reaching a final cure state, typically has a tensile strength of from about 1000 to about 3000, more typically from about 1500 to about 3000, yet more typically from about 2000 to about 3000, and yet even more typically about 2300, psi, according to ASTM D 412 and/or ASTM D 638. In certain embodiments, the elastomeric composition, upon approaching or reaching a final cure state, typically has an elongation of from about 20 to about 150, more typically from about 60 to about 150, yet more typically from about 90 to about 150, and yet even more typically about 100, %, according to ASTM D 412 and/or ASTM D 638.

In certain embodiments, the elastomeric composition, upon approaching or reaching a final cure state, typically has a (Grave's) tear strength of from about 50 to about 400, more typically from about 200 to about 400, yet more typically from about 325 to about 400, and yet even more typically about 365, ppi, according to ASTM D 624. In certain embodiments, the elastomeric composition, upon approaching or reaching a final cure state, typically has a durometer Shore D hardness of from about 20 to about 60, more typically from about 40 to about 60, yet more typically from about 50 to about 60, and yet even more typically about 54, according to ASTM D 2240. In certain embodiments, the elastomeric composition, upon approaching or reaching a final cure state, typically has a peel strength of from about 30 to about 80, more typically from about 50 to about 80, yet more typically from about 65 to about 80, and yet even more typically about 75, ppi, according to ASTM D 6862.

As described above, in certain embodiments, the elastomeric composition comprises the reaction product of the isocyanate-prepolymer, the polymeric isocyanate, the hydrophobic polyol, and the chain extender. In other embodiments, the elastomeric composition comprises the reaction product of an intermediate-prepolymer, the hydrophobic polyol, and the chain extender.

In the embodiments employing the intermediate-prepolymer, the intermediate-prepolymer is equivalent to the isocyanate component. Said another way, if employed, the intermediate-prepolymer takes place of the isocyanate component, and therefore, serves as the isocyanate component in such embodiments and descriptions thereof.

The intermediate-prepolymer typically comprises the reaction product of the isocyanate-prepolymer, the polymeric isocyanate, and the hydrophobic polyol. Optionally, the intermediate-prepolymer may comprise the further reaction product of the chain extender. Alternatively, the intermediate-prepolymer comprises the reaction product of the isocyanate-prepolymer, the polymeric isocyanate, and the chain extender. Optionally, the intermediate-prepolymer may comprise the further reaction product of the hydrophobic polyol.

Typically, the entire amount of the isocyanate-prepolymer and the polymeric isocyanate used to form the elastomeric composition is employed to form the intermediate-prepolymer. In contrast, only a portion of the hydrophobic polyol and/or the chain extender is used to form the intermediate-prepolymer, while the remainder of the hydrophobic polyol and/or the chain extender is left for use as the resin composition.

If employed, the intermediate-prepolymer is useful for achieving a desired NCO content of the isocyanate component, altering curing properties of the elastomeric composition, and altering viscosity of the elastomeric composition. The intermediate-prepolymer is especially useful for use in moist or wet conditions, as alluded to above and as described further below. Other advantages can also be appreciated with reference to the Example section below.

The present invention further provides a method of forming the elastomeric composition. The method comprises the steps of providing the isocyanate-prepolymer, the polymeric isocyanate, the hydrophobic polyol, and the chain extender. In certain embodiments, the method further comprises the step of reacting the isocyanate prepolymer and the polymeric isocyanate with the hydrophobic polyol to form the intermediate-prepolymer. In this embodiment, the method further comprises the step of reacting the intermediate-prepolymer with the resin component form the elastomeric composition. Typically, the intermediate-prepolymer is formed separate from the resin component. Alternatively, as like described above, the intermediate-prepolymer comprises the reaction product of the isocyanate-prepolymer, the polymeric isocyanate, and the chain extender.

In one embodiment, the step of forming the elastomeric composition is further defined as the separate steps of first reacting the isocyanate prepolymer and the polymeric isocyanate with an amount of the hydrophobic polyol, and optionally, an amount of the chain extender, to form the intermediate-prepolymer. Next, the intermediate-prepolymer is reacted with the remainder of at least one of the chain extender and the hydrophobic polyol (i.e., the resin component) to form the elastomeric composition.

The present invention further provides a method of forming the composite material. The method comprises the steps of providing aggregate and forming the elastomeric composition. The method further comprises the step of applying the elastomeric composition to the aggregate to form the composite material.

The elastomeric composition can be formed by various methods, such as those described above. In one embodiment, the method comprises the steps of providing the isocyanate-prepolymer, providing the polymeric isocyanate, providing the hydrophobic polyol, and providing the chain extender. The method comprises the further step of reacting the isocyanate prepolymer and the polymeric isocyanate with the hydrophobic polyol to form an intermediate-prepolymer. Typically, the isocyanate prepolymer and the polymeric isocyanate are mixed prior to the step of reacting the isocyanate prepolymer and the polymeric isocyanate with the hydrophobic polyol. The method comprises the further step of reacting the intermediate-prepolymer with the resin composition to form the elastomeric composition. Typically, the steps of reacting occur independent from each other.

When formed from the isocyanate and resin components, the isocyanate index of the elastomeric composition is typically from about 70 to about 200, more typically from about 90 to about 175, yet more typically from about 100 to about 175, yet even more typically from about 105 to about 168, and yet even more typically about 121.

The elastomeric composition may be referred to in the art as a 2K elastomeric polyurethane composition. The isocyanate and resin components are mixed to form the reaction product of the elastomeric composition. The term reaction product as used herein is intended to encompass all stages of interaction and/or reaction between the isocyanate and resin components, including reaction products of the isocyanate and resin components, even when the reaction product contacts the aggregate to form the composite material. Generally, the reaction product begins to form when the isocyanate and resin components come into contact with each other.

Typically, the step of applying is further defined as coating the aggregate with the elastomeric composition. A suitable method of coating includes tumble-coating the aggregate with the elastomeric composition in an apparatus. Suitable apparatuses include, but are not limited to, those described further below. Typically, the steps of forming and applying are contemporaneous.

In certain embodiments, the composite material is at least partially submerged underwater after the step of applying the elastomeric composition to the aggregate. As such, the elastomeric composition cures to a final cure state while partially or completely submerged underwater. Typically, a surface of the elastomeric composition, i.e., an interface between the surface of the forming elastomeric composition and the water, is substantially free of bubble formation during curing of the elastomeric composition while the composite material is submerged underwater. The aforementioned lack of bubble formation is especially true when the intermediate-prepolymer is employed, as alluded to above. These embodiments may be encountered along coast lines, as introduced above.

Typically, the surface of the elastomeric composition is substantially free of bubble formation during the step of applying the elastomeric composition. Specifically, the hydrophobic nature of the elastomeric composition leads to little to no bubbling at the surface of the elastomeric composition during formation, even in the presence of water, such as when the composite material is forming (i.e., curing) underwater. Said another way, little to no foaming occurs during formation of the composite material. For example, if the isocyanate and resin components are mixed, degassed, and dumped into water while still liquid and allowed to cure into a hard elastomer, the surface of the elastomer at the interface between the elastomer and the water generally shows no sign of bubble formation, cloudiness, wrinkling, and/or another type of marring.

Generally, when the isocyanate and resin components are brought into contact with each other, such as by mixing the isocyanate and resin components together, the isocyanate and resin components begin to react to form the reaction product. The reaction product of the elastomeric composition, during formation, adheres the aggregate together to form the composite material. It is to be appreciated that the reaction product can begin to form over a period of time prior to introducing the aggregate. This is especially true if the composite article is to be formed partially or completely underwater. For example, the reaction product may be allowed to react for about 1 to about 25 minutes prior to introducing the aggregate. Typically, the aggregate is introduced before the reaction product reaches a final cure state. It is also to be appreciated that the reaction between the isocyanate and resin components may be delayed for some period of time after the isocyanate and resin components are brought into contact with each other.

The reaction between the isocyanate and resin components is commonly referred to in the art as a crosslink or crosslinking reaction, which generally results in build-up of molecular chains, i.e., molecular weight, in the reaction product to produce a crosslinked structure. Reaction of the isocyanate and resin components can occur at various temperatures, such as room or ambient temperature, although heating may be applied to one or more of the components to trigger and/or accelerate reaction between the isocyanate and resin components. In certain embodiments, although dependent in part on the specific components employed, application of heat accelerates reaction between the isocyanate and resin components. Typically, at least one of the steps of reacting occurs in at least one reaction vessel, such as when the intermediate-prepolymer is formed.

The composite material can be used for various applications and in various locations. For example, the composite material can be molded, screed, compacted or flattened to form pavement. Examples of applications employing the composite material include, but are not limited to, forming revetments, rail-road track beds, pavement, sidewalks, patios, tracks, playground surfaces, trails, landscape features, boat launch areas, etc. Such applications of the composite material can be used to prevent erosion and/or to reduce sound transmission. For example, the composite material can be used as revetment along and/or in water ways, such as along rivers, lakes, or coastlines. The composite material can be used for coastal defense. As an example, the elastomeric composition can be used to coat stone, e.g. by a tumbling process, and the coated stone can be placed along the coast line. Alternatively, the elastomeric composition can be sprayed over stones already in place, but tumbling generally provides better coating and bond strength. Geosynthetics, such as geotextiles, can also be employed around and/or under the coated stone to prevent undercutting. Once the coated stone cures to form the revetment, the revetment helps to prevent erosion of the coast line. Before the elastomeric composition fully cures, sand or other fines can be sprinkled onto the coated stones to present an aesthetic appearance and skid resistance. Void spaces within the revetment provide additional habitat for animals and plants, and the revetment easily blends into the surrounding environment, especially with local aggregate is used, and the elastomeric composition is unpigmented such that it is substantially transparent. As another example, the composite material can be used as track ballast. As an example, the elastomeric composition can be used to coat rocks, e.g. by a tumbling process, and the coated rock can be placed to form a trackbed. Alternatively, the elastomeric composition can be spray over rocks already in place. Once the coated rocks cure to form the ballast, the ballast helps to support track and distribute load, reduces flying stones and dust, and helps to prevent pulverization of the rocks. Void spaces within the ballast also provide drainage. The aforementioned applications can be formed by methods understood by those skilled in respective art, such as the civil engineering and road construction arts. For example, a conventional paving process can be used but for the replacement of concrete with the composite material of the present invention. Other applications of the composite material, such as pavement applications, are disclosed in PCT/US2010/061574 and PCT/US2010/061587 the disclosures of which are incorporated by reference in their entirety.

As a further example, certain embodiments of pavement can be formed and finished similar to low slump concrete. The composite material can be mixed in a batch process, on a small scale, using a concrete or mortar mixer. The elastomeric composition is mixed and added to the aggregate in the mixer, blended for a few minutes and then placed into forms. A vibratory screed can be used to provide a slight compaction/settling of the composite material in the forms. A smooth finish can be achieved by working the surface with a bull float (Fresno blade) or a power trowel, and the edges around the forms can be finished with an edge trowel.

Depending on weather conditions, the composite material can be tack free within about 4 to 6 hours, can be walked on in about 24 hours, and typically has achieved about 95% of its final hardness within 72 hours. If the surface is to be driven on, it can typically withstand the force of vehicle traffic after about 4 days. Optionally, an aliphatic polyurethane surface coating can be sprayed or rolled on after the composite material is tack free to ensure a wearing surface that is very stable to torsional forces, such as from tires turning upon it. Also, sand or other small aggregate or fines can be broadcast over the curing top coat to provide an anti-skid surface on slopes or areas with high foot traffic.

Typically, the composite material, once cured, is self-supporting. Said another way, a support structure is not required to support, or to be embedded within, the composite material. An example of a conventional support structure used for paving applications is GEOBLOCK®, commercially available from PRESTOGEO SYSTEMS® of Appleton, Wis. One disadvantage of using such a support structure is that the support structure has a coefficient of thermal expansion significantly greater than a coefficient of thermal expansion of the aggregate of the composite material, e.g. glass. Specifically, the coefficient of thermal expansion of the aggregate is typically less than the coefficient of thermal expansion of the support structure. The difference between the coefficient of thermal expansion between the aggregate and the support structure can result in failure of the composite material.

As such, in certain embodiments of the present invention, the composite material of the present invention, once cured, is completely free of a supplemental support structure, e.g. GEOBLOCK®. For example, the composite material can be used for paving applications without relying on the support structure. Surprisingly, the elastomeric composition of the present invention allows for the exclusion of such support structures, which can negatively impact cured composite articles including them, such as by warping or buckling pavement because of thermal expansion and contraction differences between the composite material and the embedded or underlying support structure.

The composite material either before or after final cure state, can be formed into various shapes of varying dimensions. For example, the composite material can essentially be planar (e.g. when the composite material is employed as pavement) having a thickness of from about 0.5 to about 6.0, more typically from about 1.0 to about 4.0, and yet more typically from about 2.0 to about 3.0, inches. It is to be appreciated that thickness of the composite material, depending on its application, may be uniform or may vary.

Once the elastomeric composition of the composite material begins to cure, the composite material only remains pliable or workable for a limited time until the composite material reaches a cure state such that the composite material is no longer pliable or workable. Typically, the composite material has a working time of from about 1 to about 40, more typically from about 1 to about 30, and yet more typically from about 1 to about 20, minutes. In one embodiment, the composite material has a working time of from about 30 to 45 minutes. Once the elastomeric composition fully cures, the composite material is fully formed. The composite material, even when fully cured, may be further processed, such as by cutting or sanding the composite material for various applications. Final cure time of the composite material can be affected by many variables. Typically, the composite material reaches a final cure state after about 30 days at an average temperature of about 72° F. and an average relative humidity of about 50%.

In the methods above, the step of coating the aggregate with the elastomeric composition can be accomplished through many different methods and can be a batch, semi-batch, or a continuous process. In one embodiment, the aggregate and the elastomeric composition are mixed for a period of time. It should be appreciated that the elastomeric composition may be formed prior to or during introduction to the aggregate. Alternatively, the aggregate, the isocyanate component, and the resin component, may be introduced simultaneously and mixed. The order of addition of the components to form the composite material can be of any order. The period of time referred to above is the period of time for which the elastomeric composition is mixed with the aggregate. The period of time is sufficient to coat the aggregate with the elastomeric composition and is typically from about 10 seconds to about 10 minutes, and more typically from about 10 seconds to about 5 minutes. The aggregate coated with the elastomeric composition is typically removed from the mixer or any other apparatus prior to full curing of the elastomeric composition to form the composite material.

The elastomeric composition and the aggregate may be mixed by any method known in the art, including rotating drums, tumblers, single-shaft batch mixers, twin-shaft batch mixers, spiral-bladed drums, etc. In another embodiment of the present invention, the step of coating the aggregate with the elastomeric composition is accomplished by spraying. In this embodiment, the elastomeric composition can be at least partially formed before or during the step of spraying. Spraying can be accomplished by any method known in the art, such as by impingement mixing of the components in the elastomeric composition, mechanical mixing and spraying, etc. A specific example of a suitable apparatus for forming the composite material is disclosed in PCT/EP2010/058989, which is incorporated herewith by reference in its entirety. It should be appreciated that the aggregate may be stationary or, alternatively, the aggregate may be disposed in a tumbler or other moveable drum to increase the surface area of the aggregate exposed to the sprayed elastomeric composition as the aggregate is in motion in the tumbler or the other moveable drum. The aggregate could also be sprayed while the rock is disposed along an area, e.g. a coastal area, which the composite material is to be formed on. As described above, when the aggregate is sprayed while the aggregate is in the tumbler, the aggregate coated with the elastomeric composition is typically removed from the tumbler prior to fully curing the elastomeric binding composition to form the composite material.

When the elastomeric composition is sprayed, it should be appreciated that the isocyanate component and the resin component may be mixed before or after exiting a nozzle of the sprayer. In one embodiment, the resin and isocyanate components are separate streams when exiting the nozzle of the sprayer and mix prior to coating the aggregate. In other embodiments, the resin and isocyanate components are premixed prior to leaving the nozzle of the sprayer. For example, in one embodiment, the intermediate-prepolymer is formed prior to forming the elastomeric composition.

After the aggregate is coated with the elastomeric composition, and after optional mixing of the same, the elastomeric composition cures to form the composite material. In embodiments where the aggregate, e.g. rock, and the elastomeric composition are mixed in the mixer, the elastomeric composition is typically cured outside of the mixer. For example, the composite material can be placed along a coastal area that is to be reinforced prior to full curing of the elastomeric composition.

It should be appreciated that at least one layer, such as a compensating layer, may be placed on the coastal area prior to placing the aggregate coated with the elastomeric composition thereon to further increase the durability and adhesion of the composite material. In one embodiment, the compensating layer is placed on the coastal area and the aggregate coated with the elastomeric composition is placed thereon prior to fully curing the elastomeric composition. Curing of the elastomeric composition is typically passive, i.e., there is no need for an affirmative step, such as heating, etc., to cure the bonding composition and curing naturally occurs.

Typically, the need for the composite material exists where water is posing a current threat of erosion of a coastal area, and therefore removal of water can be time consuming, difficult, and burdensome. The elastomeric composition, especially when the intermediate-prepolymer is employed, can be cured in the presence of water while maintaining excellent cohesive strength between the elastomeric composition and aggregate, e.g. rock. The ability to cure in the presence of water is attributable to the components of the system, such as the hydrophobic polyol. The presence of water can be from various sources, such as rain, high tide, waves from a body of water adjacent the coastal area, etc. In addition, as described above, it should be appreciated that the elastomeric composition can be cured while underwater, i.e., while partially or completely submerged, while maintaining excellent cohesion between the elastomeric composition and aggregate, excellent durability, and excellent compressibility of the composite material formed therefrom. The ability to cure underwater greatly enhances the versatility of the elastomeric composition and composite material formed therefrom.

The composite material can also be at least partially cured in a mold, which may be closed-type or open-type mold. The mold can define a cavity that substantially encapsulates the aggregate coated with the elastomeric composition or, alternatively, can define an open cavity that does not substantially encapsulate the aggregate coated with the elastomeric composition. Additionally, the mold can be a reaction injection mold (RIM) wherein the isocyanate and resin components are separately injected into the mold having the aggregate disposed therein. Molds can be useful for forming various shapes of the composite material, such as bricks.

To reiterate, depending in part on the environment in which the system is employed, the hydrophobic polyol is useful in preventing and/or minimizing a competing reaction between the isocyanate-prepolymer, the polymeric isocyanate, and water molecules. Additionally, the hydrophobic polyol reacts with the isocyanate-prepolymer and/or the polymeric isocyanate to form the elastomeric composition. Water and NCO functional group containing components, i.e., the isocyanate-prepolymer and the polymeric isocyanate, readily react in the presence of each other. When a conventional composition is exposed to water prior to complete curing, the competing reaction between the water and the isocyanate components can have undesirable effects on the resulting conventional composite material, such as reduced durability, reduced cohesive strength, reduced tensile strength, etc. However, in the present invention, the resin component has a strong aversion for water, thereby reducing the interaction and the competing reaction between the isocyanate component and the water. When the composite material of the present invention is used for revetments, the elastomeric composition is frequently exposed to water prior to complete curing, as described above.

The composite material can also be used for repair purposes, such as for repairing a pothole or other void in an asphalt or concrete surface. As such, the present invention also provides a method of repairing a pavement having an outer surface with a repairable void in the outer surface. The method may first comprise the step of removing any debris from the repairable void, such as removing trash or pieces of broken pavement from the repairable void. The method further comprises the step of disposing a quantity of the composite material into the repairable void, and optionally, on the pavement proximal the repairable void, to form a mound. The method further comprises the step of compacting the mound to form a repair structure for the repairable void. The repair structure has a repair surface substantially parallel with the outer surface of the pavement. It is to be appreciated that portions of the quantity of the composite material may be disposed and compacted in a plurality of steps in order to completely fill the repairable void.

The method may further comprise the step of applying the elastomeric composition of the composite material into the repairable void prior to the step of disposing. This step may be useful for ensuring a tight bond between the composite material and the surrounding asphalt or concrete. The tight bond can also be present without this step, based merely on the presence of the elastomeric composition in the composite material itself. The tight bond is useful for preventing water or other liquids from seeping into the void and further degrading the pavement. Typically, the composite material is nonporous for such repair applications. The method may also include the step of enlarging the hole, such as saw-cutting around the repairable void to define a cleaner edged repairable void for repair.

In certain embodiments, the composite material is porous to allow passage of water or other liquids through the pavement. For example, in certain embodiments, the pavement has an inner surface opposite the outer surface, and the method further comprises the step of extending the repairable void away from the outer surface and through the inner surface to form a channel through the pavement prior to the step of disposing. If the composite material is porous, liquid can flow from the outer surface to the inner surface of the pavement through the repair surface disposed within the channel of the pavement. It is be appreciated that such steps, or similar steps, could also be done to emulate grates, manhole covers, etc., for allowing passage of liquid through the pavement.

Referring now to the Figures, FIG. 1 is a partial cross-sectional view of a pavement structure 20 illustrating water migration 22 through the pavement structure 20. The pavement structure 20 includes an upper layer $T_1$ of composite material 24. The composite material 24 is typically porous; however, there are embodiments where the composite material 24 is non-porous. In order to place such the pavement structure 20, native soil 26 is typically excavated to a depth appropriate for the regional weather conditions and how the native soil 26 drains. In some Northern climates this could be as much as 24 inches, if not more. The area is then typically lined with a geosynthetic 28, and a storage layer $T_3$ including about 0.38 to about 0.75 inch diameter open graded aggregate is installed and compacted. The storage layer $T_3$ may also be referred to as a base course layer $T_3$. Next, about 2 inches of open graded choker course having about 0.25 to about 0.5 inch diameter aggregate, is installed and compacted to form a choker course layer $T_2$. Next, the upper layer $T_1$ (or wearing course layer $T_1$) of composite material 24 is installed to a thickness of about 2.5 to about 3.5 inches, depending on end application such as for walking or driving pavements, i.e., driving pavements would be thicker because of increased load. It is to be appreciated that each of the layers $T_1$, $T_2$, and $T_3$ are not drawn to scale and may be of larger or smaller thicknesses, and such thicknesses can be uniform or may vary. It is also to be appreciated that any one of the choker course layer $T_2$, the storage layer $T_3$, and/or the geosynthetic 28 may be excluded from the pavement structure 20 depending on need or application. In certain embodiments, at least one of the layers $T_1$, $T_2$, and $T_3$ has little to no fines. It is believed that fines can impede flow of liquid through the pavement structure 20. As such, in certain embodiments, the pavement structure 20 includes no more than about 5% fines based on screening of the respective aggregates. The pavement structure 20 may also include additional storage base or underground storage below the storage layer $T_3$. In certain embodiments, the pavement structure 20 includes an overcoat disposed on a surface of the upper layer $T_1$. The overcoat can be formed to various thicknesses, such as 5 mils or greater, and may comprise the elastomeric composition 30. If the overcoat is not formed from the elastomeric composition 30, it should be formed from a UV stable composition, such as from a UV stable polyurethane elastomer composition. UV stability can be imparted via use of one or more additives understood in the art, and/or from use of an aliphatic isocyanate. The overcoat (not shown) is useful to prevent spalling of the aggregate 32. The overcoat can also be used for reducing porosity of the pavement structure 20. Sand or other fines may be sprinkled on the upper layer $T_1$ prior to the elastomeric composition 30 reaching a final cure state to provide skid resistance. The overcoat may be tinted with a colorant to provide an aesthetic appearance or be left naturally colored.

The geosynthetic 28 may be located at different levels as well, such as between the choker course $T_2$ and the storage layer $T_3$. While not shown, the geosynthetic 28 may also extend upwardly toward the upper layer $T_1$, such as up and around outer edges of the storage layer $T_3$. Examples of suitable geosynthetics 28, for purposes of the present invention, include geotextiles, geogrids, geonets, geomembranes, geosynthetic clay liners, geofoam, drainage/infiltration cells, geocomposites, etc. In certain embodiments, the geosynthetic 28 is a geotextile, such as a non-woven geotextile. In certain embodiments, the pavement structure 20 is free of a grid, such as those disclosed in U.S. Patent Publication Nos. 2009/0067924 and 2009/0067295.

Figure 2:
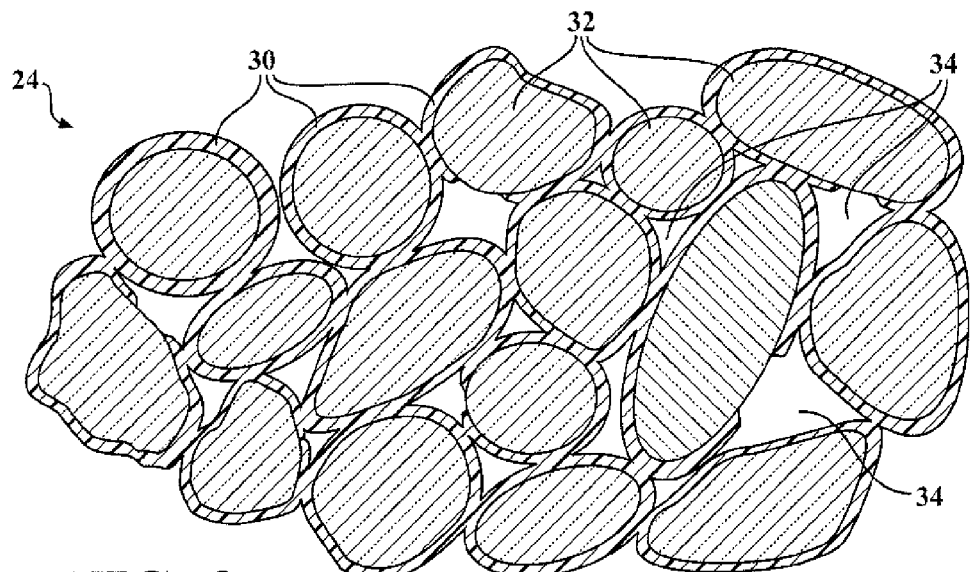
FIG. 2 is an enlarged view depicting a porous embodiment of the composite material.

FIG. 2 is an enlarged view depicting a porous embodiment of the composite material 24, e.g. the composite material 24 of FIG. 1. The composite material 24 includes the elastomeric composition 30 in a cured state and the aggregate 32. Typically, the cured elastomeric composition 30 is substantially to completely free of bubbles and/or voids itself. The composite material 24 defines a plurality of void spaces 34. It is to be appreciated that the aggregate 32 can either be completely or partially encapsulated by the elastomeric composition 30. Typically, when the composite material 24 is in a porous configuration, there are little to no fines within the composite material 24 or void spaces 34 thereof.

Figure 3:
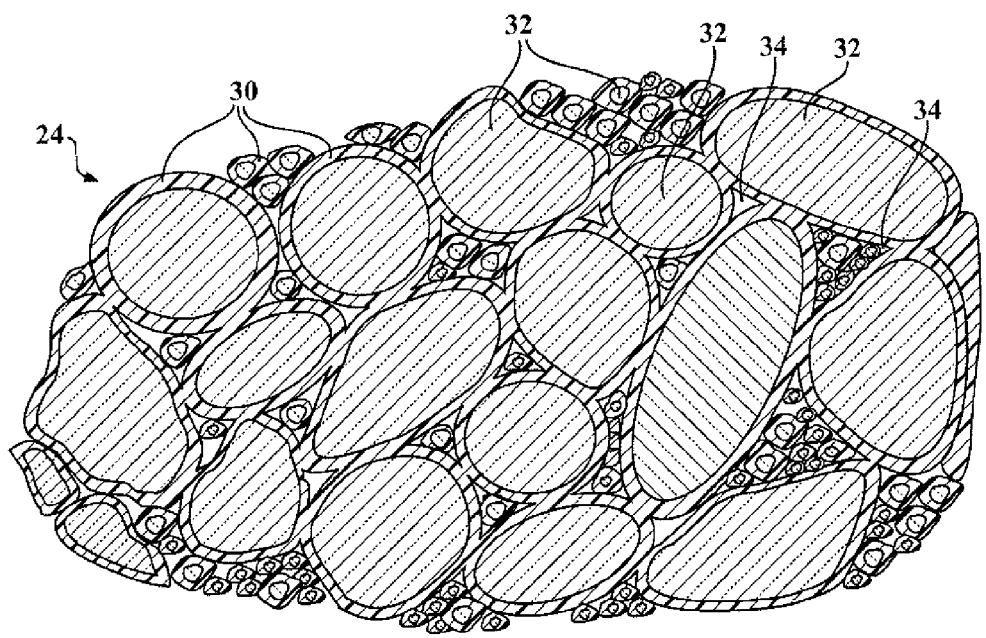
FIG. 3 is an enlarged view depicting a nonporous embodiment of the composite material.

FIG. 3 is an enlarged view depicting a nonporous embodiment of the composite material 24. As depicted, the void spaces 34 are smaller in number and in size. Such a transition of the composite material 24 from a porous to nonporous state may occur from an increased amount of the elastomeric composition 30 relative to the amount of aggregate 32, from increased compacting during installation, and/or from a different size distribution of the aggregate 32 where smaller aggregate 32 or even fines (not shown) fills in many, if not all, of the void spaces 34. Typically, the composite material 24 is configured to be nonporous merely by increasing the amount of the elastomeric composition 30 relative to the amount of aggregate 32.

The following examples, illustrating the system, elastomeric compositions and composite materials of the present invention, are intended to illustrate and not to limit the invention.

EXAMPLES

Examples of the resin and isocyanate components of the system are prepared. Examples of the elastomeric composition are also prepared. The resin and isocyanate components are formed by mixing their respective components in a vessel. The vessel is a container capable of withstanding agitation and having resistance to chemical reactivity. The components of the resin and isocyanate components were mixed using a mixer for 1 to 3 minutes at 1000 to 3500 rpm. The resin and isocyanate components were mixed in a similar manner to form the elastomeric compositions.

The amount and type of each component used to form the Resin and Isocyanate Components are indicated in TABLES I and II below with all values in parts by weight (pbw) based on 100 parts by weight of the respective Resin or Isocyanate Component unless otherwise indicated. The symbol '-' indicates that the component is absent from the respective Resin or Isocyanate Component.

TABLE I

|  | Example 1 | Example 2 | Example 3 |
|---|---|---|---|
| Resin Component |  |  |  |
| Hydrophobic Polyol 1 | 73.00 | — | — |
| Hydrophobic Polyol 2 | 20.00 | — | — |
| Hydrophobic Polyol 3 | — | 69.50 | — |
| Hydrophobic Polyol 4 | — | 15.23 | — |
| Hydrophobic Polyol 5 | — | 3.81 | — |
| Hydrophobic Polyol 6 | — | — | 50.00 |
| Supplemental Polyol | — | — | 49.45 |
| Chain Extender | — | — | — |
| Molecular Sieve 1 | 6.95 | 6.62 | — |
| Molecular Sieve 2 | — | — | 0.50 |
| Aminosilane | — | — | — |
| Antifoaming Agent 1 | 0.05 | — | — |
| Antifoaming Agent 2 | — | 0.05 | 0.05 |
| Fumed Silica | — | 4.79 | — |
| Resin Total | 100.00 | 100.00 | 100.00 |

TABLE I-continued

|  | Example 1 | Example 2 | Example 3 |
|---|---|---|---|
| Isocyanate Component |  |  |  |
| Isocyanate-prepolymer | — | — | — |
| Polymeric isocyanate | 100.00 | 100.00 | 100.00 |
| Isocyanate Total Elastomeric Composition | 100.00 | 100.00 | 100.00 |
| Resin/Isocyanate Weight Ratio | 2.000 | 2.000 | 1.222 |
| Isocyanate Index | 118 | 138 | 124 |

TABLE II

|  | Example 4 | Example 5 | Example 6 |
|---|---|---|---|
| Resin Component |  |  |  |
| Hydrophobic Polyol 1 | — | — | — |
| Hydrophobic Polyol 2 | — | — | — |
| Hydrophobic Polyol 3 | — | — | — |
| Hydrophobic Polyol 4 | 16.40 | — | — |
| Hydrophobic Polyol 5 | 4.10 | — | — |
| Hydrophobic Polyol 6 | 78.45 | 91.95 | 92.45 |
| Supplemental Polyol | — | — | — |
| Chain Extender | — | 7.00 | 7.00 |
| Molecular Sieve 1 | — | — | — |
| Molecular Sieve 2 | 0.50 | 0.50 | 0.50 |
| Aminosilane | 0.50 | 0.50 | — |
| Antifoaming Agent 1 | — | — | — |
| Antifoaming Agent 2 | 0.05 | 0.05 | 0.05 |
| Fumed Silica | — | — | — |
| Resin Total | 100.00 | 100.00 | 100.00 |
| Isocyanate Component |  |  |  |
| Isocyanate-prepolymer | — | 60.00 | 60.00 |
| Polymeric isocyanate | 100.00 | 40.00 | 40.00 |
| Isocyanate Total Elastomeric Composition | 100.00 | 100.00 | 100.00 |
| Resin/Isocyanate Weight Ratio | 1.916 | 1.400 | 1.404 |
| Isocyanate Index | 136 | 121 | 121 |

Hydrophobic Polyol 1 is a branched polyether/polyester polyol having a hydroxyl value of from 160-185 mg KOH/g and a functionality of about 3.5, commercially available from Cognis Corporation.

Hydrophobic Polyol 2 is a slightly branched polyether/polyester polyol having a hydroxyl value of from 210-245 mg KOH/g, and a functionality of about 2.1, commercially available from Cognis Corporation.

Hydrophobic Polyol 3 is a branched polyether/polyester polyol having a hydroxyl value of from 160-185 mg KOH/g and a functionality of about 3.5, commercially available from Cognis Corporation.

Hydrophobic Polyol 4 is a slightly branched aliphatic diol having a hydroxyl value of from 117-130 mg KOH/g, and a functionality of about 2.2, commercially available from Cognis Corporation.

Hydrophobic Polyol 5 is a branched polyether/polyester polyol having a hydroxyl value of from 300-330 mg KOH/g, and a functionality of about 3.0, commercially available from Cognis Corporation.

Hydrophobic Polyol 6 is castor oil, commercially available from Eagle Specialty Products, Inc.

Supplemental Polyol is a trifunctional polyol formed by adding propylene oxide to a glycerine initiator, having a hydroxyl number of from 388-408 mg KOH/g, commercially available from BASF Corporation.

Chain Extender is DPG.

Molecular Sieve 1 is Baylith Paste, commercially available from JACAAB L.L.C. of St. Louis, Mo.

Molecular Sieve 2 is Molecular Sieve 3A.

Aminosilane is SILQUEST® A-1100, commercially available from Momentive Performance Products.

Antifoaming Agent 1 is Antifoam MSA, commercially available from Dow Corning.

Antifoaming Agent 2 is Antifoam A, commercially available from Dow Corning.

Fumed Silica is AEROSIL® R-972, commercially available from Evonik Degussa.

Isocyanate-prepolymer is a liquid, modified short chain prepolymer based on pure 4,4'-MDI and having an NCO content of 22.9 wt. %, commercially available from BASF Corporation.

Polymeric isocyanate is a PMDI with a functionality of about 2.7 and an NCO content of 31.5 wt. %, commercially available from BASF Corporation.

Examples 1-4 are comparative examples and Examples 5 and 6 are inventive examples. Example 2 has poor reproducibility. Example 3 is susceptible to water, causing failure to composite materials formed therefrom. Examples 4, 5 and 6 have excellent hydrophobicity and strength properties.

To evaluate physical properties of the composite materials, various tests are conducted. Crush strength (or compressive strength) is determined according to ASTM D 1621. Flexural strength is determined according to ASTM D 790. Flexural modulus is determined according to ASTM D 790. Porosity (or void volume) is determined by either of the methods described in: Montes, F., Valavala, S., and Haselbach, L. "A New Test Method for Porosity Measurements of Portland Cement Pervious Concrete," J. ASTM Int. 2(1), 2005 and Crouch, L. K., Cates, M., Dotson, V. James, Jr., Honeycutt, Keith B., and Badoe, D. A. "Measuring the Effective Air Void Content of Portland Cement Pervious Pavements," ASTM Journal of Cement, Concrete, and Aggregates, 25(1), 2003. Permeability is determined by either of the methods described in: Montes, F., Haselbach, L. "Measuring Hydraulic Conductivity in Pervious Concrete," Env. Eng. Sci. 23(6), 2006 and Schaefer, V., Wang, K., Suleimman, M. and Kevem, J. "Mix Design Development for Pervious Concrete in Cold Weather Climates," Final Report, Civil Engineering, Iowa State University, 2006.

Results of physical testing of the elastomeric compositions of Examples 1-5 are indicated in TABLE III below. The symbol '- - -' indicates that the result was not tested or obtained.

TABLE III

| Elastomeric Composition | Example 1 | Example 2 | Example 3 | Example 4 | Example 5 |
|---|---|---|---|---|---|
| Tensile Strength, psi | 3,190 | — | 7,517 | 871 | 2,324 |
| Elongation, % | 20 | — | 6 | 92 | 99 |
| Grave's Tear Strength, ppi | 188 | — | 405 | 64 | 365 |
| Durometer Shore Hardness | 70 (D) | — | 68 (D) | 74 (A) | 54 (D) |
| Tg, ° C. | — | — | 70 | 24 | 41 |

Results of physical testing of the elastomeric composition of Example 6, as well as composite material including the same and aggregate are indicated in TABLE IV below. To form the composite material, 4.2 wt. % of the elastomeric composition is mixed with 95.8 wt. % aggregate, which in Example 6 below is 100% glass having an average diameter of about ¼ inches. The glass is commercially available from Glass Plus Inc. of Tomahawk, Wis. The glass is silylated. In order to make the glass silylated, the glass is tumbled with an aqueous solution comprising 0.3 wt. % SILQUEST® A-1120, which is commercially available from Momentive Performance Products. To surface treat the glass, 5 parts of the aqueous solution is tumbled with 100 parts of the glass for about 5 minutes. The aqueous solution is then drained off and the glass is allowed to dry. The glass, now surface treated (or "silylated"), is used to form the composite material. Said another way, the glass now includes one or more functional groups imparted by the organofunctional alkoxy silane, i.e., SILQUEST® A-1120, reacting with the glass. The functional groups, e.g. amine groups, are reactive with isocyanate functional groups of the elastomeric composition. The isocyanate functional groups can be free isocyanate functional groups after reaction to form the elastomeric composition, such as in instances of over indexing, or isocyanate functional groups imparted by one or more components of the elastomeric composition itself, e.g. the isocyanate-prepolymer, such that the functional groups of the glass become part of the reaction to form the elastomeric composition. The results for Example 6* below, Composite Material, is with surface treated glass as the aggregate.

TABLE IV

| Elastomeric Composition | Example 6 |
| --- | --- |
| Tensile Strength, psi | 2,685 |
| Elongation, % | 100 |
| Grave's Tear Strength, ppi | 426 |
| Durometer Shore Hardness, D | 56 |
| Peel Strength, ppi | 75 |
| Tg, ° C. | 44 |

| Composite Material | Example 6* |
| --- | --- |
| Crush Strength, psi | 1,550 |
| Flexural Strength, psi | 711 |
| Flexural Modulus, psi | 84,633 |
| Porosity, % | 37.6 |
| Permeability, in/hr | 1,650 |

Composite Materials using both untreated and surface treated glass were prepared and tested. In TABLE V below, the Composite Material of Example 6 comprises untreated glass and the Composite Material of Example 6* uses surface treated glass, as described and illustrated above. Crush strength of the two examples was also tested after boiling the Composite Materials in water for 140 minutes. The physical test results are indicated in TABLE V below. The symbol '- - -' indicates that the result was not tested or obtained.

TABLE V

| Composite Material | Example 6 | Example 6* | Example 6 (after 140 min. in boiling water) | Example 6* (after 140 min. in boiling water) |
| --- | --- | --- | --- | --- |
| Crush Strength, psi | 1,050 | 1,550 | 175 | 1,190 |
| Flexural Strength, psi | 468 | 711 | — | — |
| Flexural Modulus, psi | 104,984 | 84,633 | — | — |

Figure 4:
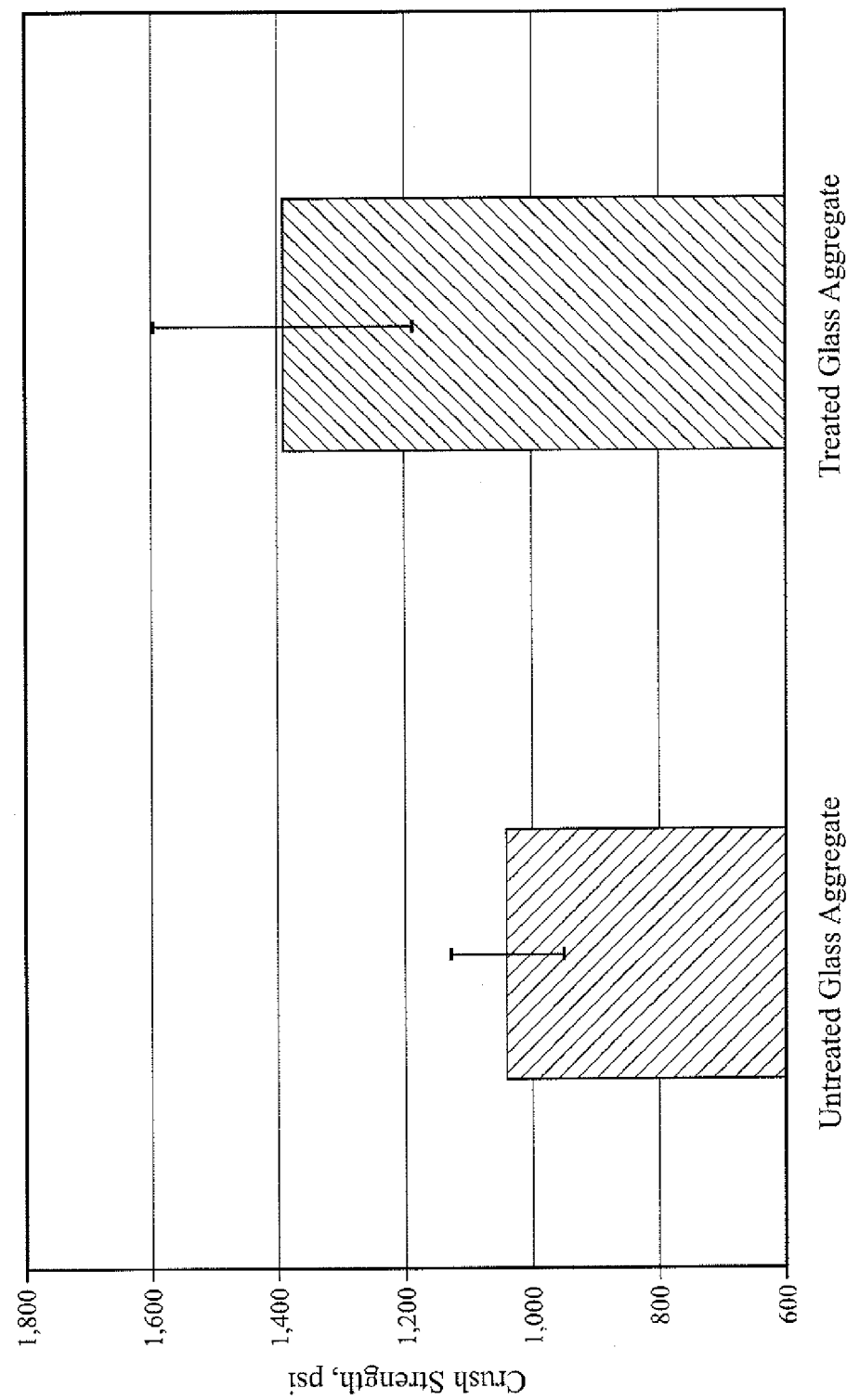
FIG. 4 is a bar graph illustrating crush strength results between untreated and treated aggregate.

With reference to TABLE V above, it can be appreciated that surface treating the glass used to form the inventive composite materials of the present invention can have dramatic effects on physical properties, with great increases in crush strength (and increased resiliency with extended temperature exposure), and great increases in flexural strength. Additional testing is done to confirm findings. FIG. 4 shows a dramatic improvement in compressive strength (approximately 40%) achieved by pre-treating the glass with an aminosilane solution. Thermal cycling in high humidity conditions shows little or no loss in compressive strength after 75 cycles between −10° C. and 25° C.

Additional preparations and testing of Example 6* is carried to better establish physical properties of the same. These physical properties, and the respective test methods, are shown in TABLE VI below.

TABLE VI

| Property | Value | Test Method |
| --- | --- | --- |
| Density (lbs/ft$^3$) | 66 | ASTM D-1622 |
| Hardness (Instant, Shore "D") | 56 | ASTM D-2240 |
| Hardness (Dwell, Shore "D") | 45 | ASTM D-2240 |
| Tensile Strength (psi) | 2500 | ASTM D-412 |
| Elongation (% at break) | 50 | ASTM D-412 |
| Tear Strength (pli) | 600 | ASTM D-624 |

Figure 5:
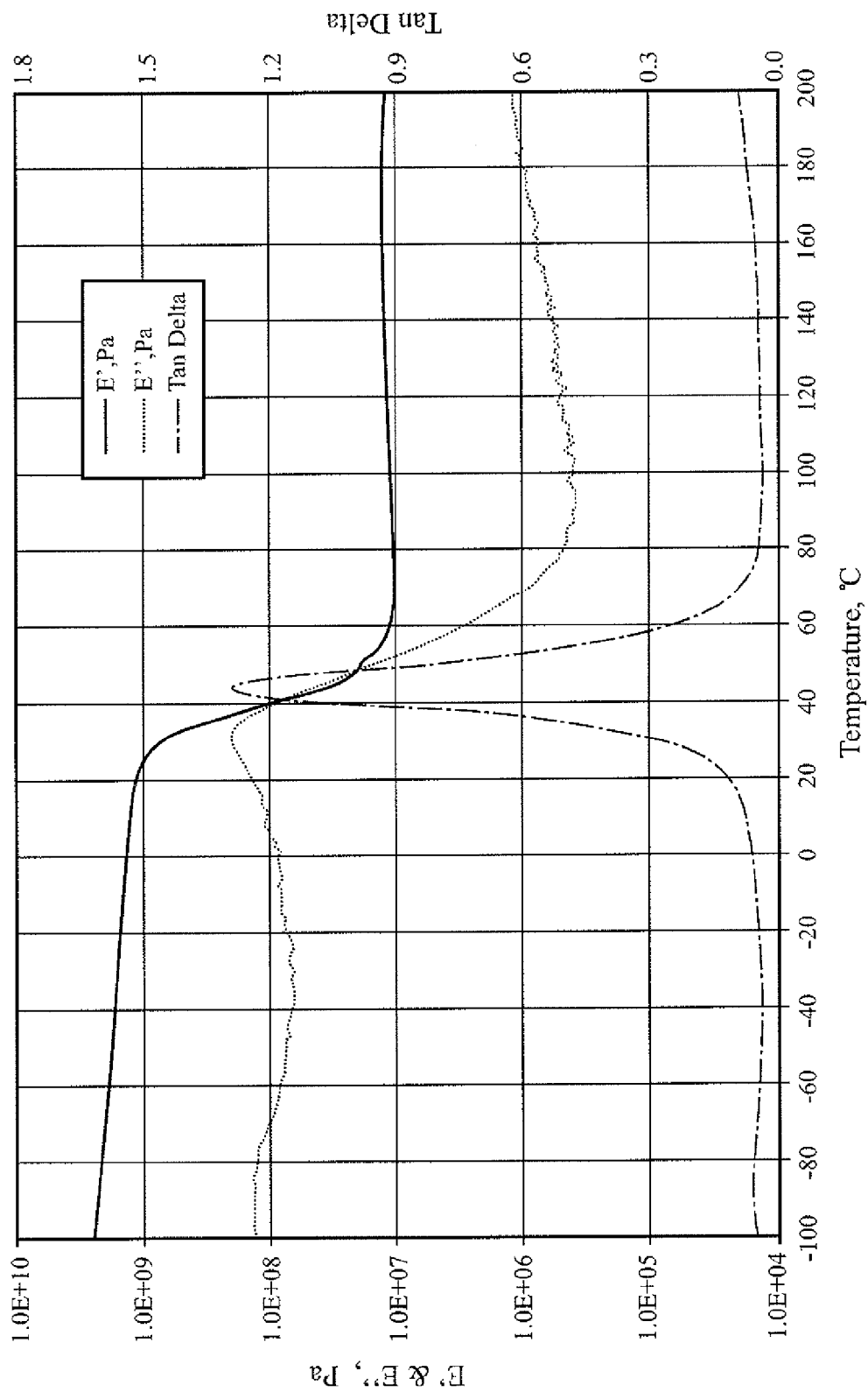
FIG. 5 is a plot illustrating Dynamic Mechanical Analysis (DMA) results of a composite material.

The elastomeric composition of Examples 6 and 6* provides consistent physical properties for the composite material over a wide range of temperatures as shown by the dynamic mechanical analysis (DMA) of the cured elastomeric composition as illustrated in FIG. 5.

It is believed that the composite material can also be used reduce urban heat island effects. As such, additional formulation and testing on composite materials similar to Examples 6 and 6* is carried out utilizing different types of colorants as illustrated below in TABLE VII with examples E1-E6.

TABLE VII

| Pavement | SRI |
| --- | --- |
| E1, "Sapphire Blue" | 49 |
| E2, "Topaz Brown" | 51 |
| E3, "Sedona Red" | 53 |
| E4, "Amber Brown" | 61 |
| E5, "Jade Green" | 62 |
| E6, unpigmented | 69 |
| New Asphalt | 0 |
| Old Asphalt | 6 |
| New Concrete | 38-52 |
| Old Concrete | 19-32 |

As illustrated in TABLE VII above, all five color variants of the composite material, when formed into pavement (E1-E5), have a Solar Reflective Index (SRI) substantially greater than 29, as does the unpigmented example (E6). TABLE VII also includes SRI data for conventional pavements formed from asphalt and concrete. As shown, unpigmented and pigmented embodiments of the composite material all have excellent SRI values. SRI evaluation is performed in accordance with ASTM E 1980.

Another inventive example is created, Example 7, which is chemically the same as Example 6. However, Example 7 is formed step-wise including a step of forming an intermediate-prepolymer, while Example 6 is formed in a batch fashion excluding the formation of the intermediate-prepolymer. To form Example 7, first, a quasi-prepolymer is prepared by reacting a portion of the Resin Composition (either all or a portion of Hydrophobic Polyol 6; or either all or a portion of each of Hydrophobic Polyol 6 and Chain Extender) with the Isocyanate Component to form an intermediate-prepolymer. Next, the intermediate-prepolymer is reacted with the remainder of the Resin Composition to form the Elastomeric Composition. Example 7 has a number of advantages over Example 6. For example, the intermediate-prepolymer is more compatible with the remainder of the Resin Composition (relative to the Isocyanate and Resin Components of Example 6) such that mixing is improved.

In addition, the intermediate-prepolymer has better low temperature properties compared to the Isocyanate Component, which makes it more robust for use in various locations. For example, because the reaction between the intermediate-prepolymer and the Resin composition generally has a lower exotherm relative to the reaction of the Isocyanate and Resin Components (i.e., a reaction all at once), it is believed that elastomeric compositions formed from the intermediate-prepolymer will generally have less thermal shrinkage relative to elastomeric compositions not employing the intermediate-prepolymer. Furthermore, because mixing properties are improved via use of the intermediate-prepolymer, it is believed that use of the same should allow for improved reaction at lower temperatures relative to elastomeric compositions not employing the intermediate-prepolymer.

Additional inventive examples are prepared, to further illustrate properties of the intermediate-prepolymers of the present invention. One example, Example 8, includes a Resin Component comprising 53.99 pbw of Hydrophobic Polyol 6, 4.09 pbw of Chain Extender, 0.029 pbw of Molecular Sieve 2, and 0.03 pbw of Antifoaming Agent 2. Example 8 further includes an Isocyanate Component comprising 24.96 pbw of Isocyanate-prepolymer and 16.64 pbw of Polymeric isocyanate. Each of the aforementioned pbw values are based on 100 parts by weight of the overall elastomeric composition, on a pre-reaction basis, before the Resin and Isocyanate Components are mixed to form Example 8. To form an elastomeric composition, i.e., Example 8, the Resin and Isocyanate Components are mixed to form a reaction mixture. The reaction mixture is allowed to react for 20 minutes. After this 20 minute period, aggregate, e.g. glass, is coated with the reaction mixture to form a composite material. The composite material comprises about 4.2 wt. % of the elastomeric composition and about 95.8 wt. % aggregate. Upon coating of the aggregate, the composite material is immediately introduced into water, e.g. by dumping, such that the composite material is submerged while curing to a final cure state. The composite material cured to the final cure state very well and had little to no evidence of reaction with the water (based upon visual inspection). The reaction mixture had a free NCO content of about 22.7% at the 20 minute time described above. Based on the free NCO content, the point of reaction where little to no reaction with water occurs can be determined Therefore, an intermediate prepolymer having the same free NCO content is prepared. The point of reaction can vary based on which materials are employed, however, the method of determining the proper free NCO content, based on allocating certain time intervals prior to introduction of water, works the same.

Inventive Examples 9 and 10 are prepared, both of which are intermediate-prepolymers. Example 9 is prepared as follows: 362.48 g of Polymeric isocyanate and 543.72 g of Isocyanate-prepolymer are charged to a 2-L glass flask with agitation to form an Isocyanate Component. The Isocyanate Component is heated to 60° C. and 93.8 g of Hydrophobic Polyol 6 is gradually added, while maintaining the temperature below 80° C. After addition of the Hydrophobic Polyol 6 is complete, the reaction mixture is heated to 80° C. for one hour. The reaction mixture, i.e., the intermediate prepolymer, is cooled to room temperature thereafter.

Example 10 is prepared as follows: 365.70 g of Polymeric isocyanate and 548.55 g of Isocyanate-prepolymer are charged to a 2-L glass flask with agitation to form an Isocyanate Component. The Isocyanate Component is heated to 60° C. and 79.71 g of Hydrophobic Polyol 6 and 6.04 g of Chain Extender are gradually added, while maintaining the temperature below 80° C. After addition of the Hydrophobic Polyol 6 and Chain Extender is complete, the reaction mixture is heated to 80° C. for one hour. The reaction mixture, i.e., the intermediate prepolymer, is cooled to room temperature thereafter.

To evaluate physical properties of the elastomer compositions (without aggregate), upon approaching or reaching a final cure state, various tests are conducted. Tensile strength and Elongation is determined according to ASTM D 412 or ASTM D 638. Grave's tear strength is determined according to ASTM D 624. Durometer Shore D hardness is determined according to ASTM D 2240. Peel strength is determined according to ASTM D 6862.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The invention may be practiced otherwise than as specifically described within the scope of the appended claims.

What is claimed is:

1. A composite material comprising:
   aggregate; and
   an elastomeric composition comprising the reaction product of:
      an isocyanate component comprising
         a polymeric isocyanate, and optionally,
         an isocyanate-prepolymer, and
      an isocyanate-reactive component comprising
         a hydrophobic polyol, and
         a chain extender having at least two hydroxyl groups and a molecular weight of from about 62 to about 220,
         wherein said chain extender is present in said isocyanate-reactive component in an amount of from about 1 to about 20 parts by weight based on 100 parts by weight of said isocyanate-reactive component; and
      wherein said elastomeric composition is present in said composite material in an amount of from about 1 to about 10 parts by weight based on 100 parts by weight of said composite material.

2. A composite material as set forth in claim 1 wherein said isocyanate component comprises said polymeric isocyanate and said isocyanate-prepolymer and said isocyanate-prepolymer is present in said isocyanate component in an amount of from about 25 to about 75 parts by weight based on 100 parts by weight of said isocyanate component.

3. A composite material as set forth in claim 2 wherein said chain extender is present in said isocyanate-reactive component in an amount of from about 5 to about 10 parts by weight based on 100 parts by weight of said isocyanate-reactive component.

4. A composite material as set forth in claim 1 wherein said aggregate comprises glass.

5. A composite material as set forth in claim 1 wherein said aggregate comprises rock.

6. A composite material as set forth in claim 5 wherein said rock is:
   i) selected from the group of marble, beach stone, river rock, and combinations thereof; or
   ii) granite.

7. A composite material as set forth in claim 5 wherein said rock has an average diameter of from about ¼ inch to about 5 inches.

8. A composite material as set forth in claim 1 wherein said aggregate comprises crumb rubber.

9. A composite material as set forth in claim 1 wherein said hydrophobic polyol comprises a natural oil polyol and wherein said natural oil polyol is castor oil.

10. A composite material as set forth in claim 1 wherein said chain extender comprises an alkylene glycol and wherein said alkylene glycol is dipropylene glycol.

11. A composite material as set forth in claim 1 wherein:
    i) said isocyanate-prepolymer comprises the reaction product of a diphenylmethane diisocyanate and a polyol, has an NCO content of about 22.9 wt. %, and an average NCO functionality of from about 2 to about 3; and/or
    ii) said polymeric isocyanate comprises polymeric diphenylmethane diisocyanate, has an NCO content of about 31.5 wt. %, and an average NCO functionality of from about 2 to about 3.

12. A composite material as set forth in claim 1 wherein said hydrophobic polyol is present in said isocyanate-reactive component in an amount of from about 80 to about 99 parts by weight based on 100 parts by weight of said isocyanate-reactive component.

13. A composite material as set forth in claim 1 wherein said aggregate is selected from the group of glass, rock, rubber crumb, and combinations thereof, said isocyanate component comprises said polymeric isocyanate and said isocyanate-prepolymer, said isocyanate-prepolymer comprises the reaction product of a diphenylmethane diisocyanate and a polyol, said polymeric isocyanate comprises polymeric diphenylmethane diisocyanate, said hydrophobic polyol comprises a natural oil polyol, and said chain extender comprises an alkylene glycol.

14. A composite material as set forth in claim 13 wherein said isocyanate-prepolymer is present in said isocyanate component in an amount of from about 25 to about 75 parts by weight based on 100 parts by weight of said isocyanate component, said hydrophobic polyol is present in said isocyanate-reactive component in an amount of from about 80 to about 99 parts by weight, and said chain extender is present in said isocyanate-reactive component in an amount of from about 10 to about 5 parts by weight, each based on 100 parts by weight of said isocyanate-reactive component.

15. A composite material as set forth in claim 14 wherein said natural oil polyol is castor oil, said alkylene glycol is dipropylene glycol, and said elastomeric composition is present in said composite material in an amount of from about 2.5 to about 5.0 parts by weight based on 100 parts by weight of said composite material.

16. A revetment or track ballast comprising the composite material as set forth in claim 1.

17. A method of forming a composite material, said method comprising the steps of:
    providing aggregate;
    forming an elastomeric composition comprising the reaction product of:
       an isocyanate component comprising
          a polymeric isocyanate, and optionally,
          an isocyanate-prepolymer, and
       an isocyanate-reactive component comprising
          a hydrophobic polyol, and
          a chain extender having at least two hydroxyl groups and a molecular weight of from about 62 to about 220,
          wherein the chain extender is present in the isocyanate-reactive component in an amount of from about 1 to about 20 parts by weight based on 100 parts by weight of the isocyanate-reactive component; and applying the elastomeric composition to the aggregate to form the composite material;

wherein the elastomeric composition is present in the composite material in an amount of from about 1 to about 10 parts by weight based on 100 parts by weight of the composite material.

18. A method as set forth in claim 17 wherein:
i) the step of applying is further defined as coating the aggregate with the elastomeric composition; and/or
ii) the step of applying is further defined as tumble-coating the aggregate with the elastomeric composition in an apparatus; and/or
iii) the step of forming and the step of applying are contemporaneous.

19. A method as set forth in claim 17 wherein:
i) the isocyanate component comprises the polymeric isocyanate and the isocyanate-prepolymer and the isocyanate-prepolymer is present in the isocyanate component in an amount of from about 25 to about 75 parts by weight based on 100 parts by weight of the isocyanate component; and/or
ii) the chain extender is present in the isocyanate-reactive component in an amount of from about 5 to about 10 parts by weight based on 100 parts by weight of the isocyanate-reactive component.

20. A method as set forth in claim 17 wherein the aggregate comprises glass, rock, crumb rubber, or combinations thereof.

21. A method as set forth in claim 17 wherein the aggregate comprises rock and wherein the rock is:
i) selected from the group of marble, beach stone, river rock, and combinations thereof; or
ii) granite.

22. A method as set forth in claim 17 wherein:
i) the hydrophobic polyol comprises a natural oil polyol and wherein the natural oil polyol is castor oil; and/or
ii) the chain extender comprises an alkylene glycol and wherein the alkylene glycol is dipropylene glycol.

23. A method as set forth in claim 17 wherein:
i) the isocyanate-prepolymer comprises the reaction product of a diphenylmethane diisocyanate and a polyol, has an NCO content of about 22.9 wt. %, and an average NCO functionality of from about 2 to about 3; and/or
ii) the polymeric isocyanate comprises polymeric diphenylmethane diisocyanate, has an NCO content of about 31.5 wt. %, and an average NCO functionality of from about 2 to about 3.

24. A method as set forth in claim 17 wherein the hydrophobic polyol is present in the isocyanate-reactive component in an amount of from about 80 to about 99 parts by weight based on 100 parts by weight of the isocyanate-reactive component.

* * * * *